(12) United States Patent
Chen et al.

(10) Patent No.: US 9,413,936 B2
(45) Date of Patent: Aug. 9, 2016

(54) IMAGING LENS HAVING SIX LENS ELEMENTS, AND ELECTRONIC APPARATUS INCLUDING THE SAME

(71) Applicant: Genius Electronic Optical Co., Ltd., Taichung (TW)

(72) Inventors: Shih-Han Chen, Taichung (TW); Yita Chiang, Taichung (TW); Lai-Shu Cao, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 135 days.

(21) Appl. No.: 14/138,468

(22) Filed: Dec. 23, 2013

(65) Prior Publication Data
US 2015/0062406 A1    Mar. 5, 2015

(30) Foreign Application Priority Data

Aug. 29, 2013 (CN) .......................... 2013 1 0385419

(51) Int. Cl.
| | |
|---|---|
| G02B 13/18 | (2006.01) |
| G02B 9/62 | (2006.01) |
| H04N 5/225 | (2006.01) |
| G02B 5/00 | (2006.01) |
| G02B 13/00 | (2006.01) |

(52) U.S. Cl.
CPC .......... *H04N 5/2254* (2013.01); *G02B 13/0045* (2013.01); *G02B 5/005* (2013.01); *G02B 9/62* (2013.01); *G02B 13/002* (2013.01); *G02B 13/18* (2013.01)

(58) Field of Classification Search
CPC ...... G02B 13/0045; G02B 9/62; G02B 13/18; G02B 5/005; G02B 13/002

USPC .................. 359/713, 739, 740, 756, 757, 759
See application file for complete search history.

(56) References Cited

U.S. PATENT DOCUMENTS

| | | | |
|---|---|---|---|
| 7,663,814 B2 | 2/2010 | Kitahara | |
| 8,040,618 B2 | 10/2011 | Kitahara | |
| 8,379,323 B2 | 2/2013 | Huang et al. | |
| 8,385,006 B2 | 2/2013 | Tsai et al. | |
| 8,743,482 B1* | 6/2014 | Tsai et al. | ...................... 359/757 |
| 2010/0305405 A1 | 12/2010 | Miyano | |
| 2012/0170142 A1 | 7/2012 | Hsieh et al. | |
| 2012/0194726 A1 | 8/2012 | Huang et al. | |
| 2012/0314304 A1* | 12/2012 | Huang | ............... G02B 13/0045 |
| | | | 359/759 |

FOREIGN PATENT DOCUMENTS

| | | |
|---|---|---|
| CN | 202067015 U | 12/2011 |
| CN | 202837662 U | 3/2013 |
| TW | 201243386 A1 | 11/2012 |
| TW | 201250333 A1 | 12/2012 |
| TW | 201300824 A1 | 1/2013 |
| TW | 201305596 A1 | 2/2013 |
| TW | 201312155 A1 | 3/2013 |
| TW | 201317619 A1 | 5/2013 |
| TW | 201321830 A1 | 6/2013 |

* cited by examiner

*Primary Examiner* — Evelyn A Lester
(74) *Attorney, Agent, or Firm* — Jianq Chyun IP Office

(57) ABSTRACT

An imaging lens includes an aperture stop and first to sixth lens elements arranged from an object side to an image side in the given order. Through designs of surfaces of the lens elements and relevant optical parameters, a short system length of the imaging lens may be achieved while maintaining good optical performance.

16 Claims, 32 Drawing Sheets

| system focal length =3.37mm, half field-of-view =34.1°, F-number =2.40, system length =4.23mm ||||||||
|---|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.140 | | | | |
| first lens element 3 | object-side surface 31 | 1.549 | 0.420 | 1.546 | 56.114 | plastic | 2.638 |
| | image-side surface 32 | -18.493 | 0.070 | | | | |
| second lens element 4 | object-side surface 41 | -4.466 | 0.490 | 1.546 | 56.114 | plastic | 22.755 |
| | image-side surface 42 | -3.412 | 0.070 | | | | |
| third lens element 5 | object-side surface 51 | -5.524 | 0.200 | 1.638 | 23.256 | plastic | -4.748 |
| | image-side surface 52 | 6.917 | 0.450 | | | | |
| fourth lens element 6 | object-side surface 61 | -1.959 | 0.465 | 1.535 | 55.635 | plastic | 3.076 |
| | image-side surface 62 | -0.970 | 0.060 | | | | |
| fifth lens element 7 | object-side surface 71 | -116.488 | 0.300 | 1.535 | 55.635 | plastic | 38.235 |
| | image-side surface 72 | -17.451 | 0.060 | | | | |
| sixth lens element 8 | object-side surface 81 | -11.377 | 0.300 | 1.535 | 55.635 | plastic | -3.409 |
| | image-side surface 82 | 2.198 | 0.400 | | | | |
| optical filter 9 | object-side surface 91 | ∞ | 0.110 | | | | |
| | image-side surface 92 | ∞ | 0.834 | | | | |
| image plane 10 | | ∞ | | | | | |

FIG.3

| surface | 31 | 32 | 41 | 42 | 51 | 52 |
|---|---|---|---|---|---|---|
| K | -1.088E+00 | -2.715E+01 | 7.173E+00 | 0.000E+00 | 2.991E+01 | -1.630E+01 |
| $a_4$ | -8.306E-03 | -1.171E-01 | -3.060E-03 | 5.513E-02 | -3.666E-02 | -3.086E-02 |
| $a_6$ | -1.712E-02 | 1.921E-01 | 1.965E-01 | 2.300E-02 | 1.744E-01 | 1.565E-01 |
| surface | 61 | 62 | 71 | 72 | 81 | 82 |
| K | 0.000E+00 | -9.077E-01 | 1.733E+01 | 1.450E+02 | 3.794E+01 | -1.068E+01 |
| $a_4$ | -3.076E-02 | 8.480E-02 | -2.256E-01 | -2.618E-01 | -4.127E-02 | -4.492E-02 |
| $a_6$ | 6.651E-02 | 2.283E-02 | 4.833E-02 | 8.842E-02 | 1.369E-02 | -1.021E-03 |

FIG.4 system focal length =3.36mm, half field-of-view =34.3°, F-number =2.40, system length =4.44mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.140 | | | | |
| first lens element 3 | object-side surface 31 | 1.506 | 0.420 | 1.546 | 56.114 | plastic | 2.650 |
| | image-side surface 32 | -33.534 | 0.070 | | | | |
| second lens element 4 | object-side surface 41 | -4.803 | 0.270 | 1.546 | 56.114 | plastic | 41.193 |
| | image-side surface 42 | -4.036 | 0.070 | | | | |
| third lens element 5 | object-side surface 51 | -5.595 | 0.200 | 1.638 | 23.256 | plastic | -4.811 |
| | image-side surface 52 | 7.010 | 0.490 | | | | |
| fourth lens element 6 | object-side surface 61 | -3.447 | 0.950 | 1.535 | 55.635 | plastic | 2.487 |
| | image-side surface 62 | -1.054 | 0.060 | | | | |
| fifth lens element 7 | object-side surface 71 | -40.071 | 0.300 | 1.535 | 55.635 | plastic | 70.999 |
| | image-side surface 72 | -19.575 | 0.060 | | | | |
| sixth lens element 8 | object-side surface 81 | -20.023 | 0.300 | 1.535 | 55.635 | plastic | -2.913 |
| | image-side surface 82 | 1.703 | 0.400 | | | | |
| optical filter 9 | object-side surface 91 | ∞ | 0.110 | | | | |
| | image-side surface 92 | ∞ | 0.738 | | | | |
| image plane 10 | | ∞ | | | | | |

FIG.7

| surface | 31 | 32 | 41 | 42 | 51 | 52 |
|---|---|---|---|---|---|---|
| K | -8.855E-01 | -2.089E+01 | 1.015E+01 | 0.000E+00 | 3.194E+01 | -1.812E+01 |
| $a_4$ | -6.097E-04 | -1.185E-01 | 4.753E-03 | 5.421E-02 | -1.795E-02 | 5.775E-03 |
| $a_6$ | -1.122E-02 | 1.760E-01 | 1.748E-01 | 3.676E-02 | 1.904E-01 | 1.667E-01 |
| surface | 61 | 62 | 71 | 72 | 81 | 82 |
| K | 0.000E+00 | -8.880E-01 | 9.059E+01 | 1.560E+02 | 1.111E+02 | -5.425E+00 |
| $a_4$ | -5.401E-02 | 8.717E-02 | -2.408E-01 | -2.651E-01 | -4.620E-02 | -3.894E-02 |
| $a_6$ | 5.117E-03 | -2.561E-02 | 5.632E-02 | 7.645E-02 | 1.057E-02 | -9.815E-05 |

FIG.8

FIG.11 system focal length =4.17mm, half field-of-view =35.6°, F-number =2.20, system length =5.28mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.190 | | | | |
| first lens element 3 | object-side surface 31 | 1.908 | 0.847 | 1.546 | 56.114 | plastic | 3.544 |
| | image-side surface 32 | 115.382 | 0.089 | | | | |
| second lens element 4 | object-side surface 41 | -6.146 | 0.309 | 1.650 | 21.667 | plastic | -19.103 |
| | image-side surface 42 | -12.306 | 0.588 | | | | |
| third lens element 5 | object-side surface 51 | -2.594 | 0.401 | 1.535 | 55.635 | plastic | 58.472 |
| | image-side surface 52 | -2.525 | 0.169 | | | | |
| fourth lens element 6 | object-side surface 61 | -2.999 | 0.534 | 1.535 | 55.635 | plastic | 3.028 |
| | image-side surface 62 | -1.119 | 0.068 | | | | |
| fifth lens element 7 | object-side surface 71 | -4.125 | 0.479 | 1.650 | 21.667 | plastic | -8.614 |
| | image-side surface 72 | -16.007 | 0.355 | | | | |
| sixth lens element 8 | object-side surface 81 | -6.121 | 0.367 | 1.535 | 55.635 | plastic | -2.958 |
| | image-side surface 82 | 2.186 | 0.450 | | | | |
| optical filter 9 | object-side surface 91 | ∞ | 0.300 | | | | |
| | image-side surface 92 | ∞ | 0.323 | | | | |
| image plane 10 | | ∞ | | | | | |

| surface | 31 | 32 | 41 | 42 | 51 | 52 |
|---|---|---|---|---|---|---|
| K | -7.303E+00 | 0.000E+00 | 0.000E+00 | 1.118E+02 | 0.000E+00 | 0.000E+00 |
| $a_4$ | 1.203E-01 | -9.661E-02 | -1.035E-01 | -1.934E-02 | -1.320E-01 | -1.087E-01 |
| $a_6$ | -5.430E-02 | 9.046E-02 | 2.397E-01 | 1.053E-01 | 1.032E-02 | -9.255E-03 |
| $a_8$ | -2.643E-03 | -1.406E-01 | -5.068E-01 | -1.238E-01 | -1.104E-01 | -1.845E-02 |
| $a_{10}$ | 1.303E-02 | 3.136E-02 | 7.350E-01 | 7.232E-02 | 1.155E-01 | 2.578E-02 |
| $a_{12}$ | 1.481E-02 | | -8.090E-01 | 1.975E-02 | -2.599E-02 | |
| $a_{14}$ | -1.9640E-02 | | 4.9283E-01 | -6.2709E-02 | | |
| $a_{16}$ | | | -1.20870E-01 | 2.6280E-02 | | |
| $a_{18}$ | | | | | | |

| surface | 61 | 62 | 71 | 72 | 81 | 82 |
|---|---|---|---|---|---|---|
| K | 3.907E+00 | -7.052E-01 | -6.337E+01 | -1.542E+04 | 0.000E+00 | -1.399E+01 |
| $a_4$ | -6.115E-02 | 1.426E-01 | 1.555E-03 | 3.223E-03 | -8.299E-02 | -7.441E-02 |
| $a_6$ | 1.417E-02 | -9.697E-02 | -1.160E-02 | -1.593E-03 | 7.374E-02 | 4.255E-02 |
| $a_8$ | 3.182E-02 | 8.164E-02 | 4.424E-03 | -1.174E-03 | -3.911E-02 | -2.004E-02 |
| $a_{10}$ | -8.922E-03 | -2.678E-02 | -1.124E-03 | 2.748E-04 | 1.318E-02 | 6.128E-03 |
| $a_{12}$ | -7.173E-04 | 2.644E-03 | -1.937E-04 | 8.567E-06 | -2.545E-03 | -1.224E-03 |
| $a_{14}$ | | | 5.368E-05 | -4.602E-06 | 2.574E-04 | 1.543E-04 |
| $a_{16}$ | | | | | -1.065E-05 | -1.082E-05 |
| $a_{18}$ | | | | | | 3.107E-07 |

FIG.12 system focal length =4.04mm, half field-of-view =36.8°, F-number =2.20, system length =5.39mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.190 | | | | |
| first lens element 3 | object-side surface 31 | 1.939 | 0.583 | 1.546 | 56.114 | plastic | 3.808 |
| | image-side surface 32 | 25.768 | 0.107 | | | | |
| second lens element 4 | object-side surface 41 | -7.683 | 0.730 | 1.650 | 21.667 | plastic | -35.553 |
| | image-side surface 42 | -11.891 | 0.634 | | | | |
| third lens element 5 | object-side surface 51 | -1.993 | 0.326 | 1.535 | 55.635 | plastic | 22.843 |
| | image-side surface 52 | -1.812 | 0.073 | | | | |
| fourth lens element 6 | object-side surface 61 | -4.144 | 0.790 | 1.535 | 55.635 | plastic | 2.603 |
| | image-side surface 62 | -1.114 | 0.060 | | | | |
| fifth lens element 7 | object-side surface 71 | -4.306 | 0.261 | 1.650 | 21.667 | plastic | -5.844 |
| | image-side surface 72 | 35.663 | 0.439 | | | | |
| sixth lens element 8 | object-side surface 81 | -5.515 | 0.335 | 1.535 | 55.635 | plastic | -2.811 |
| | image-side surface 82 | 2.119 | 0.450 | | | | |
| optical filter 9 | object-side surface 91 | ∞ | 0.300 | | | | |
| | image-side surface 92 | ∞ | 0.301 | | | | |
| image plane 10 | | ∞ | | | | | |

FIG.15

| surface | 31 | 32 | 41 | 42 | 51 | 52 |
|---|---|---|---|---|---|---|
| K | -7.693E+00 | 0.000E+00 | 0.000E+00 | 9.717E+01 | 0.000E+00 | 0.000E+00 |
| a4 | 1.146E-01 | -8.442E-02 | -1.009E-01 | -3.016E-02 | -1.425E-01 | -6.413E-02 |
| a6 | -5.505E-02 | 1.027E-01 | 2.427E-01 | 8.610E-02 | 1.983E-02 | -1.917E-03 |
| a8 | 2.504E-03 | -1.462E-01 | -5.117E-01 | -1.121E-01 | -1.083E-01 | -1.115E-02 |
| a10 | 1.144E-02 | 2.324E-02 | 7.289E-01 | 8.192E-02 | 1.188E-01 | 2.117E-02 |
| a12 | 8.231E-03 | | -8.061E-01 | 1.853E-02 | -2.108E-02 | |
| a14 | -2.3028E-02 | | 5.0008E-01 | -6.4836E-02 | | |
| a16 | | | -1.1834E-01 | 2.7445E-02 | | |
| a18 | | | | | | |
| surface | 61 | 62 | 71 | 72 | 81 | 82 |
| K | 3.480E+00 | -7.097E-01 | -1.196E+01 | -7.017E+02 | 0.000E+00 | -1.207E+01 |
| a4 | -4.849E-02 | 1.158E-01 | -2.187E-02 | -4.000E-03 | -7.532E-02 | -7.212E-02 |
| a6 | -5.131E-03 | -1.103E-01 | -1.615E-03 | -1.277E-03 | 7.268E-02 | 4.263E-02 |
| a8 | 2.216E-02 | 7.810E-02 | 3.280E-03 | -3.937E-04 | -3.915E-02 | -2.005E-02 |
| a10 | -9.926E-03 | -2.578E-02 | -1.140E-03 | 2.142E-04 | 1.319E-02 | 6.121E-03 |
| a12 | 1.542E-03 | 3.679E-03 | -1.266E-04 | -8.198E-06 | -2.545E-03 | -1.225E-03 |
| a14 | | | 5.656E-05 | -2.902E-06 | 2.576E-04 | 1.543E-04 |
| a16 | | | | | -1.067E-05 | -1.081E-05 |
| a18 | | | | | | 3.130E-07 |

FIG.16

| system focal length =4.09mm, half field-of-view =36.4°, F-number =2.20, system length =5.39mm | | | | | | | |
|---|---|---|---|---|---|---|---|
| lens element | surface | | radius of curvature | thickness | refractive index | Abbe number | material | focal length |
| object | | | ∞ | ∞ | | | | |
| aperture stop 2 | | | ∞ | -0.190 | | | | |
| first lens element 3 | object-side surface 31 | 1.937 | 0.600 | 1.546 | 56.114 | plastic | 3.795 |
| | image-side surface 32 | 26.518 | 0.108 | | | | |
| second lens element 4 | object-side surface 41 | -7.675 | 0.725 | 1.650 | 21.667 | plastic | -35.384 |
| | image-side surface 42 | -11.899 | 0.622 | | | | |
| third lens element 5 | object-side surface 51 | -2.018 | 0.325 | 1.535 | 55.635 | plastic | 23.432 |
| | image-side surface 52 | -1.837 | 0.076 | | | | |
| fourth lens element 6 | object-side surface 61 | -3.898 | 0.796 | 1.535 | 55.635 | plastic | 2.596 |
| | image-side surface 62 | -1.099 | 0.063 | | | | |
| fifth lens element 7 | object-side surface 71 | -4.335 | 0.239 | 1.650 | 21.667 | plastic | -5.845 |
| | image-side surface 72 | 33.810 | 0.436 | | | | |
| sixth lens element 8 | object-side surface 81 | -5.658 | 0.300 | 1.535 | 55.635 | plastic | -2.861 |
| | image-side surface 82 | 2.145 | 0.450 | | | | |
| optical filter 9 | object-side surface 91 | ∞ | 0.300 | | | | |
| | image-side surface 92 | ∞ | 0.348 | | | | |
| image plane 10 | | | ∞ | | | | | |

FIG.19

| surface | 31 | 32 | 41 | 42 | 51 | 52 |
|---|---|---|---|---|---|---|
| K | -7.669E+00 | 0.000E+00 | 0.000E+00 | 9.708E+01 | 0.000E+00 | 0.000E+00 |
| a4 | 1.149E-01 | -8.505E-02 | -1.018E-01 | -3.038E-02 | -1.424E-01 | -6.409E-02 |
| a6 | -5.476E-02 | 1.025E-01 | 2.425E-01 | 8.602E-02 | 1.983E-02 | -1.837E-03 |
| a8 | 2.755E-03 | -1.462E-01 | -5.119E-01 | -1.122E-01 | -1.083E-01 | -1.115E-02 |
| a10 | 1.161E-02 | 2.343E-02 | 7.286E-01 | 8.183E-02 | 1.188E-01 | 2.113E-02 |
| a12 | 8.420E-03 | | -8.063E-01 | 1.852E-02 | -2.111E-02 | |
| a14 | -2.2822E-02 | | 4.9984E-01 | -6.4823E-02 | | |
| a16 | | | -1.1857E-01 | 2.7472E-02 | | |
| a$_{18}$ | | | | | | |

| surface | 61 | 62 | 71 | 72 | 81 | 82 |
|---|---|---|---|---|---|---|
| K | 3.515E+00 | -7.112E-01 | -1.320E+01 | -5.285E+02 | 0.000E+00 | -1.280E+01 |
| a4 | -4.879E-02 | 1.164E-01 | -2.186E-02 | -3.834E-03 | -7.566E-02 | -7.167E-02 |
| a6 | -5.218E-03 | -1.102E-01 | -1.572E-03 | -1.326E-03 | 7.263E-02 | 4.262E-02 |
| a8 | 2.216E-02 | 7.811E-02 | 3.282E-03 | -3.973E-04 | -3.915E-02 | -2.005E-02 |
| a10 | -9.936E-03 | -2.578E-02 | -1.140E-03 | 2.159E-04 | 1.319E-02 | 6.120E-03 |
| a12 | 1.538E-03 | 3.678E-03 | -1.265E-04 | -7.825E-06 | -2.545E-03 | -1.225E-03 |
| a14 | | | 5.646E-05 | -2.857E-06 | 2.576E-04 | 1.543E-04 |
| a16 | | | | | -1.067E-05 | -1.082E-05 |
| a$_{18}$ | | | | | | 3.132E-07 |

FIG.20

FIG.23 system focal length =4.18mm, half field-of-view =35.5°, F-number =2.20, system length =5.24mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.190 | | | | |
| first lens element 3 | object-side surface 31 | 1.933 | 0.794 | 1.546 | 56.114 | plastic | 3.815 |
| | image-side surface 32 | 22.920 | 0.108 | | | | |
| second lens element 4 | object-side surface 41 | -6.826 | 0.317 | 1.650 | 21.667 | plastic | -25.729 |
| | image-side surface 42 | -11.676 | 0.783 | | | | |
| third lens element 5 | object-side surface 51 | -2.581 | 0.339 | 1.535 | 55.635 | plastic | 21.183 |
| | image-side surface 52 | -2.200 | 0.083 | | | | |
| fourth lens element 6 | object-side surface 61 | -3.253 | 0.633 | 1.535 | 55.635 | plastic | 2.941 |
| | image-side surface 62 | -1.134 | 0.063 | | | | |
| fifth lens element 7 | object-side surface 71 | -5.179 | 0.249 | 1.650 | 21.667 | plastic | -9.360 |
| | image-side surface 72 | -33.806 | 0.340 | | | | |
| sixth lens element 8 | object-side surface 81 | -4.795 | 0.330 | 1.535 | 55.635 | plastic | -2.763 |
| | image-side surface 82 | 2.196 | 0.450 | | | | |
| optical filter 9 | object-side surface 91 | ∞ | 0.300 | | | | |
| | image-side surface 92 | ∞ | 0.455 | | | | |
| image plane 10 | | ∞ | | | | | |

| surface | 31 | 32 | 41 | 42 | 51 | 52 |
|---|---|---|---|---|---|---|
| K | -8.028E+00 | 0.000E+00 | 0.000E+00 | 9.934E+01 | 0.000E+00 | 0.000E+00 |
| a4 | 1.189E-01 | -9.782E-02 | -1.183E-01 | -2.852E-02 | -1.217E-01 | -7.556E-02 |
| a6 | -5.564E-02 | 9.661E-02 | 2.447E-01 | 9.858E-02 | 2.245E-02 | -5.732E-03 |
| a8 | -5.500E-04 | -1.431E-01 | -5.098E-01 | -1.193E-01 | -1.100E-01 | -1.157E-02 |
| a10 | 1.211E-02 | 2.806E-02 | 7.295E-01 | 7.595E-02 | 1.157E-01 | 2.211E-02 |
| a12 | 1.249E-02 | | -8.068E-01 | 1.790E-02 | -2.418E-02 | |
| a14 | -1.7358E-02 | | 4.9807E-01 | -6.3049E-02 | | |
| a16 | | | -1.2221E-01 | 2.9632E-02 | | |
| $a_{18}$ | | | | | | |
| surface | 61 | 62 | 71 | 72 | 81 | 82 |
| K | 2.070E+00 | -7.218E-01 | -6.245E+01 | -2.398E+02 | 0.000E+00 | -1.259E+01 |
| a4 | -5.592E-02 | 1.285E-01 | -1.893E-02 | -2.464E-03 | -7.455E-02 | -7.563E-02 |
| a6 | 3.327E-03 | -1.077E-01 | -1.732E-03 | -1.118E-03 | 7.272E-02 | 4.327E-02 |
| a8 | 2.132E-02 | 7.796E-02 | 3.467E-03 | -6.339E-04 | -3.917E-02 | -2.004E-02 |
| a10 | -1.124E-02 | -2.629E-02 | -1.098E-03 | 2.045E-04 | 1.318E-02 | 6.115E-03 |
| a12 | 6.186E-04 | 3.439E-03 | -1.316E-04 | -6.012E-06 | -2.545E-03 | -1.226E-03 |
| a14 | | | 5.134E-05 | -2.248E-06 | 2.576E-04 | 1.542E-04 |
| a16 | | | | | -1.068E-05 | -1.082E-05 |
| $a_{18}$ | | | | | | 3.145E-07 |

| lens element | surface | radius of curvature | thickness | refractive index | Abbe number | material | focal length |
|---|---|---|---|---|---|---|---|
| \multicolumn{8}{|l|}{system focal length =3.94mm, half field-of-view =37.3°, F-number =2.20, system length =5.35mm} |
| object | | ∞ | ∞ | | | | |
| aperture stop 2 | | ∞ | -0.160 | | | | |
| first lens element 3 | object-side surface 31 | 2.042 | 0.701 | 1.546 | 56.114 | plastic | 3.743 |
| | image-side surface 32 | 2905.695 | 0.095 | | | | |
| second lens element 4 | object-side surface 41 | -6.636 | 0.345 | 1.650 | 21.667 | plastic | -22.438 |
| | image-side surface 42 | -12.338 | 0.613 | | | | |
| third lens element 5 | object-side surface 51 | -2.424 | 0.386 | 1.535 | 55.635 | plastic | 20.305 |
| | image-side surface 52 | -2.092 | 0.117 | | | | |
| fourth lens element 6 | object-side surface 61 | -3.004 | 0.562 | 1.535 | 55.635 | plastic | 2.961 |
| | image-side surface 62 | -1.107 | 0.070 | | | | |
| fifth lens element 7 | object-side surface 71 | -3.538 | 0.549 | 1.650 | 21.667 | plastic | -6.296 |
| | image-side surface 72 | -26.232 | 0.398 | | | | |
| sixth lens element 8 | object-side surface 81 | -6.684 | 0.521 | 1.535 | 55.635 | plastic | -3.510 |
| | image-side surface 82 | 2.691 | 0.450 | | | | |
| optical filter 9 | object-side surface 91 | ∞ | 0.300 | | | | |
| | image-side surface 92 | ∞ | 0.241 | | | | |
| image plane 10 | | ∞ | | | | | |

FIG.28

| surface | 31 | 32 | 41 | 42 | 51 | 52 |
|---|---|---|---|---|---|---|
| K | -8.315E+00 | 0.000E+00 | 0.000E+00 | 1.136E+02 | 0.000E+00 | 0.000E+00 |
| $a_4$ | -5.823E-02 | -8.373E-02 | -9.010E-02 | -1.738E-02 | -1.468E-01 | -1.053E-01 |
| $a_6$ | -2.033E-03 | 8.847E-02 | 2.419E-01 | 1.118E-01 | 6.121E-03 | -1.331E-02 |
| $a_8$ | 1.401E-02 | -1.440E-01 | -5.069E-01 | -1.217E-01 | -1.104E-01 | -2.462E-02 |
| $a_{10}$ | 1.351E-02 | 3.178E-02 | 7.325E-01 | 7.272E-02 | 1.161E-01 | 2.167E-02 |
| $a_{12}$ | -2.463E-02 | | -8.118E-01 | 1.986E-02 | -2.586E-02 | |
| $a_{14}$ | | | 4.928E-01 | -6.265E-02 | | |
| $a_{16}$ | | | -1.161E-01 | 2.611E-02 | | |
| $a_{18}$ | | | | | | |

| surface | 61 | 62 | 71 | 72 | 81 | 82 |
|---|---|---|---|---|---|---|
| K | 3.958E+00 | -6.858E-01 | -3.610E+01 | -1.300E+05 | 0.000E+00 | -1.729E+01 |
| $a_4$ | -5.993E-02 | 1.242E-01 | -3.572E-03 | 1.137E-02 | -8.089E-02 | -7.225E-02 |
| $a_6$ | 1.086E-02 | -9.682E-02 | -3.985E-03 | -2.926E-03 | 7.366E-02 | 4.240E-02 |
| $a_8$ | 3.139E-02 | 8.248E-02 | 3.301E-03 | -1.171E-03 | -3.914E-02 | -2.005E-02 |
| $a_{10}$ | -9.557E-03 | -2.629E-02 | -1.913E-03 | 2.877E-04 | 1.317E-02 | 6.129E-03 |
| $a_{12}$ | 3.683E-04 | 2.749E-03 | -2.545E-04 | 8.400E-06 | -2.545E-03 | -1.224E-03 |
| $a_{14}$ | | | 1.154E-04 | -4.550E-06 | 2.575E-04 | 1.543E-04 |
| $a_{16}$ | | | | | -1.063E-05 | -1.081E-05 |
| $a_{18}$ | | | | | | 3.107E-07 |

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| T1 | 0.42 | 0.42 | 0.85 | 0.58 | 0.60 | 0.79 | 0.70 |
| T2 | 0.49 | 0.27 | 0.31 | 0.73 | 0.73 | 0.32 | 0.35 |
| T4 | 0.47 | 0.95 | 0.53 | 0.79 | 0.80 | 0.63 | 0.56 |
| T5 | 0.30 | 0.30 | 0.48 | 0.26 | 0.24 | 0.25 | 0.55 |
| Gaa | 0.71 | 0.75 | 1.27 | 1.31 | 1.31 | 1.38 | 1.29 |
| ALT | 2.18 | 2.44 | 2.94 | 3.02 | 2.99 | 2.66 | 3.06 |
| AGmax | 0.45 | 0.49 | 0.59 | 0.63 | 0.62 | 0.78 | 0.61 |
| CTmax | 0.49 | 0.95 | 0.85 | 0.79 | 0.80 | 0.79 | 0.70 |
| EFL | 3.37 | 3.36 | 4.17 | 4.04 | 4.09 | 4.18 | 3.94 |
| TTL | 4.23 | 4.44 | 5.28 | 5.39 | 5.39 | 5.24 | 5.35 |
| ALT/T2 | 4.44 | 9.04 | 9.50 | 4.14 | 4.12 | 8.39 | 8.87 |
| ALT/AGmax | 4.83 | 4.98 | 5.00 | 4.77 | 4.80 | 3.40 | 5.00 |
| ALT/T4 | 4.68 | 2.57 | 5.50 | 3.83 | 3.75 | 4.21 | 5.45 |
| EFL/T1 | 8.02 | 8.00 | 4.92 | 6.93 | 6.82 | 5.27 | 5.62 |
| T5/T2 | 0.61 | 1.11 | 1.55 | 0.36 | 0.33 | 0.78 | 1.59 |
| EFL/T2 | 6.88 | 12.44 | 13.48 | 5.53 | 5.64 | 13.18 | 11.41 |
| EFL/T5 | 11.23 | 11.20 | 8.70 | 15.50 | 17.10 | 16.80 | 7.17 |
| EFL/AGmax | 7.49 | 6.86 | 7.09 | 6.38 | 6.57 | 5.34 | 6.42 |
| EFL/T4 | 7.25 | 3.54 | 7.81 | 5.11 | 5.14 | 6.61 | 7.01 |
| Gaa/AGmax | 1.58 | 1.53 | 2.16 | 2.07 | 2.10 | 1.76 | 2.11 |
| CTmax/T4 | 1.05 | 1.00 | 1.59 | 1.00 | 1.00 | 1.25 | 1.25 |

FIG.30

IMAGING LENS HAVING SIX LENS ELEMENTS, AND ELECTRONIC APPARATUS INCLUDING THE SAME

CROSS-REFERENCE TO RELATED APPLICATION

This application claims priority to Chinese Application No. 201310385419.9, filed on Aug. 29, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Many conventional imaging lenses with four lens elements may have shorter system lengths due to fewer lens elements. Increased demand for high-end products has led to growing requirements for pixels and quality of imaging lenses, and to development of further high-end products, such as imaging lenses with six lens elements. Each of U.S. Pat. Nos. 7,663,814 and 8,040,618 discloses an imaging lens that includes six lens elements, and that has a system length of over 21 mm, which disfavors reducing thickness of portable electronic devices, such as mobile phones and digital cameras. Reducing the system length of the imaging lens while maintaining satisfactory optical performance is always a goal in the industry.

SUMMARY OF THE INVENTION

Therefore, an object of the present invention is to provide an imaging lens that includes six lens elements, and that has a shorter overall length while maintaining good optical performance.

According to one aspect of the present invention, an imaging lens comprises an aperture stop, a first lens element, a second lens element, a third lens element, a fourth lens element, a fifth lens element and a sixth lens element arranged in order from an object side to an image side along an optical axis of the imaging lens. Each of the first lens element, the second lens element, the third lens element, the fourth lens element, the fifth lens element and the sixth lens element has a refractive power, and has an object-side surface facing toward the object side and an image-side surface facing toward the image side.

The refractive power of the first lens element is positive.

The image-side surface of the second lens element has a convex portion in a vicinity of the optical axis.

The image-side surface of the fourth lens element has a convex portion in a vicinity of the optical axis.

The object-side surface of the fifth lens element has a concave portion in a vicinity of a periphery of the fifth lens element.

The sixth lens element is made of a plastic material, and the image-side surface thereof has a concave portion in a vicinity of the optical axis.

The imaging lens does not include any lens element with refractive power other than the first lens element, the second lens element, the third lens element, the fourth lens element, the fifth lens element and the sixth lens element.

Another object of the present invention is to provide an electronic apparatus having an imaging lens with six lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 30 is a table that lists values of parameters of other optical relationships corresponding to the imaging lenses of the first to seventh preferred embodiments;

DETAILED DESCRIPTION OF THE PREFERRED EMBODIMENTS

Figure 1:
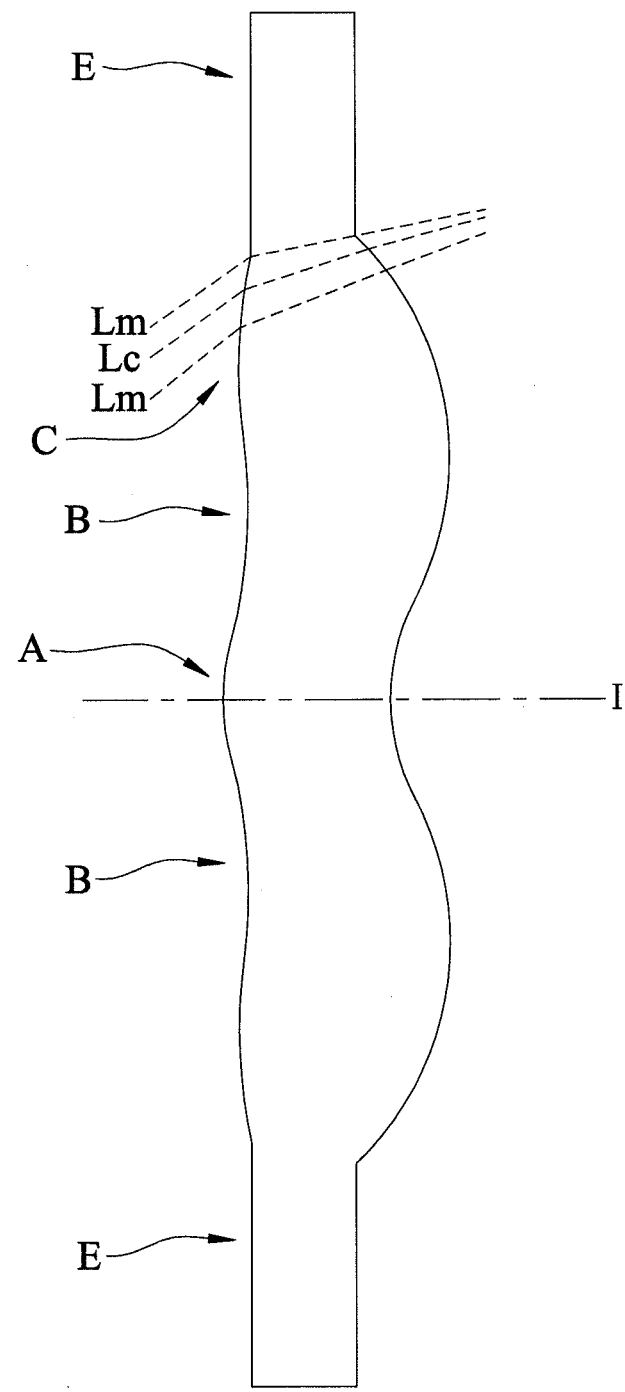
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
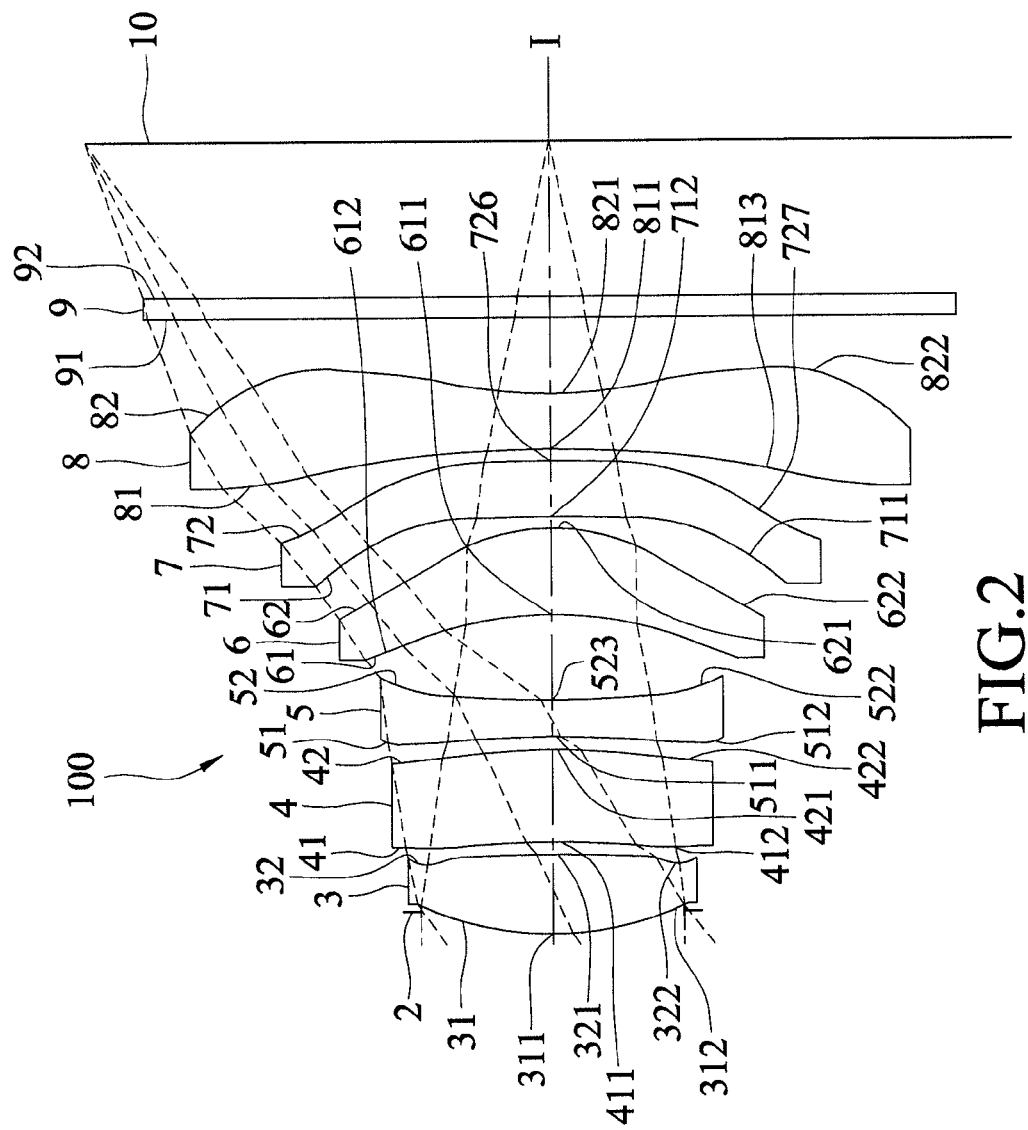
FIG. 2 is a schematic diagram that illustrates the first preferred embodiment of an imaging lens according to the present invention.

Referring to FIG. 2, the first preferred embodiment of an imaging lens 100 according to the present invention includes an aperture stop 2, first, second, third, fourth, fifth and sixth lens elements 3-8, and an optical filter 9 arranged in the given order along an optical axis (I) from an object side to an image side. The optical filter 9 is an infrared cut filter for selectively absorbing infrared light to thereby reduce imperfection of images formed at an image plane 10.

Each of the first, second, third, fourth, fifth and sixth lens elements 3-8 and the optical filter 9 has an object-side surface 31, 41, 51, 61, 71, 81, 91 facing toward the object side, and an image-side surface 32, 42, 52, 62, 72, 82, 92 facing toward the image side. Light entering the imaging lens 100 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, the object-side and image-side surfaces 81, 82 of the sixth lens element 8, and the object-side and image-side surfaces 91, 92 of the optical filter 9, in the given order, to form an image on the image plane 10. Each of the object-side surfaces 31, 41, 51, 61, 71, 81 and the image-side surfaces 32, 42, 52, 62, 72, 82 is aspherical and has a center point coinciding with the optical axis (I).

The lens elements 3-8 are made of a plastic material in this embodiment, and at least one of the lens elements 3-7 may be made of other materials in other embodiments.

In the first preferred embodiment, which is depicted in FIG. 2, the first lens element 3 has a positive refractive power. The object-side surface 31 of the first lens element 3 is a convex surface that has a convex portion 311 in a vicinity of the optical axis (I) and a convex portion 312 in a vicinity of a periphery of the first lens element 3. The image-side surface 32 of the first lens element 3 has a convex portion 321 in a vicinity of the optical axis (I), and a concave portion 322 in a vicinity of the periphery of the first lens element 3.

The second lens element 4 has a positive refractive power. The object-side surface 41 of the second lens element 4 has a concave portion 411 in a vicinity of the optical axis (I), and a convex portion 412 in a vicinity of a periphery of the second lens element 4. The image-side surface 42 of the second lens element 4 is a convex surface that has a convex portion 421 in a vicinity of the optical axis (I) and a convex portion 422 in a vicinity of the periphery of the second lens element 4.

The third lens element 5 has a negative refractive power. The object-side surface 51 of the third lens element 5 has a concave portion 511 in a vicinity of the optical axis (I), and a convex portion 512 in a vicinity of a periphery of the third lens element 5. The image-side surface 52 of the third lens element 5 is a concave surface that has a concave portion 523 in a vicinity of the optical axis (I) and a concave portion 522 in a vicinity of the periphery of the third lens element 5.

The fourth lens element 6 has a positive refractive power. The object-side surface 61 of the fourth lens element 6 is a concave surface that has a concave portion 611 in a vicinity of the optical axis (I) and a concave portion 612 in a vicinity of a periphery of the fourth lens element 6. The image-side surface 62 of the fourth lens element 6 is a convex surface that has a convex portion 621 in a vicinity of the optical axis (I) and a convex portion 622 in a vicinity of the periphery of the fourth lens element 6.

The fifth lens element 7 has a positive refractive power. The object-side surface 71 of the fifth lens element 7 is a concave surface that has a concave portion 712 in a vicinity of the optical axis (I) and a concave portion 711 in a vicinity of a periphery of the fifth lens element 7. The image-side surface 72 of the fifth lens element 7 is a convex surface that has a convex portion 726 in a vicinity of the optical axis (I) and a convex portion 727 in a vicinity of the periphery of the fifth lens element 7.

The sixth lens element 8 has a negative refractive power. The object-side surface 81 of the sixth lens element 8 is a concave surface that has a concave portion 811 in a vicinity of the optical axis (I) and a concave portion 813 in a vicinity of a periphery of the sixth lens element 8. The image-side surface 82 of the sixth lens element 8 has a concave portion 821 in a vicinity of the optical axis (I), and a convex portion 822 in a vicinity of the periphery of the sixth lens element 8.

Shown in FIG. 3 is a table that lists values of some optical parameters corresponding to the surfaces 31-91, 32-92 of the first preferred embodiment. The imaging lens 100 has an overall system effective focal length (EFL) of 3.37 mm, a half field-of-view (HFOV) of 34.1°, an F-number of 2.40, and a system length of 4.23 mm. The system length refers to a distance between the object-side surface 31 of the first lens element 3 and the image plane 10.

In this embodiment, each of the object-side surfaces 31-81 and the image-side surfaces 32-82 is aspherical, and satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:
R represents a radius of curvature of the aspherical surface;
Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);
Y represents a perpendicular distance between the arbitrary point on the aspherical surface and the optical axis (I);
K represents a conic constant; and
$a_{2i}$ represents a $2i^{th}$ aspherical coefficient.

Shown in FIG. 4 is a table that lists values of some optical parameters such as the conic constant and the aspherical coefficients of the aforementioned optical relationship (1) corresponding to the first preferred embodiment.

Relationships among some of the aforementioned optical parameters corresponding to the first preferred embodiment are as follows:
ALT/T2=4.44
ALT/AGmax=4.83
ALT/T4=4.68
EFL/T1=8.02
T5/T2=0.61
EFL/T2=6.88
EFL/T5=11.23
EFL/AGmax=7.49
EFL/T4=7.25
Gaa/AGmax=1.58
CTmax/T4=1.05
where:
T1 represents a distance between the object-side surface 31 and the image-side surface 32 of the first lens element 4 at the optical axis (I);
T2 represents a distance between the object-side surface 41 and the image-side surface 42 of the second lens element 4 at the optical axis (I);
T4 represents a distance between the object-side surface 61 and the image-side surface 62 of the fourth lens element 6 at the optical axis (I);
T5 represents a distance between the object-side surface 71 and the image-side surface 72 of the fifth lens element 7 at the optical axis (I);
Gaa represents a sum of a distance between the image-side surface 32 of the first lens element 3 and the object-side surface 41 of the second lens element 4 at the optical axis (I), a distance between the image-side surface 42 of the second lens element 4 and the object-side surface 51 of the third lens element 5 at the optical axis (I), a distance between the image-side surface 52 of the third lens element 5 and the object-side surface 61 of the fourth lens element 6 at the optical axis (I), a distance between the image-side surface 62 of the fourth lens element 6 and the object-side surface 71 of the fifth lens element 7 at the optical axis (I), and a distance between the image-side surface 72 of the fifth lens element 7 and the object-side surface 81 of the sixth lens element 8 at the optical axis (I);
ALT represents a sum of the distance between the object-side surface 31 and the image-side surface 32 of the first lens element 3 at the optical axis (I), the distance between the object-side surface 41 and the image-side surface 42 of the second lens element 4 at the optical axis (I), a distance between the object-side surface 51 and the image-side surface 52 of the third lens element 5 at the optical axis (I), the distance between the object-side surface 61 and the image-side surface 62 of the fourth lens element 6 at the optical axis (I), the distance between the object-side surface 71 and the image-side surface 72 of the fifth lens element 7 at the optical axis (I), and a distance between the object-side surface 81 and the image-side surface 82 of the sixth lens element 8 at the optical axis (I);
AGmax represents a maximum among the distance between the image-side surface 32 of the first lens element 3 and the object-side surface 41 of the second lens element 4 at the optical axis (I), the distance between the image-side surface 42 of the second lens element 4 and the object-side surface 51 of the third lens element 5 at the optical axis (I), the distance between the image-side surface 52 of the third lens element 5 and the object-side surface 61 of the fourth lens element 6 at the optical axis (I), the distance between the image-side surface 62 of the fourth lens element 6 and the object-side surface 71 of the fifth lens element 7 at the optical axis (I), and the distance between the image-side surface 72 of the fifth lens element 7 and the object-side surface 81 of the sixth lens element 8 at the optical axis (I);
CTmax represents a maximum among the distance between the object-ide surface 31 and the image-side surface 32 of the first lens element 3 at the optical axis (I), the distance between the object-side surface 41 and the image-side surface 42 of the second lens element 4 at the optical axis (I), the distance between the object-side surface 51 and the image-side surface 52 of the third lens element 5 at the optical axis (I), the distance between the object-side surface 61 and the image-side surface 62 of the fourth lens element 6 at the optical axis (I), the distance between the object-side surface 71 and the image-side surface 72 of the fifth lens element 7 at the optical axis (I), and the distance between the object-side surface 81 and the image-side surface 82 of the sixth lens element 8 at the optical axis (I); and EFL represents a system focal length of the imaging lens 100.

FIGS. 5(a) to 5(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

It can be understood from FIG. 5(a) that, since each of the curves corresponding to longitudinal spherical aberration has a focal length at each field of view (indicated by the vertical axis) that falls within the range of ±0.025 mm, the first preferred embodiment is able to achieve a relatively low spherical aberration at each of the wavelengths. Furthermore, since a deviation in focal length among the curves at each field of view does not exceed the range of ±0.015 mm, the first preferred embodiment has a relatively low chromatic aberration.

It can be understood from FIGS. 5(b) and 5(c) that, since each of the curves falls within the range of ±0.1 mm of focal length, the first preferred embodiment has a relatively low optical aberration.

Figure 5:
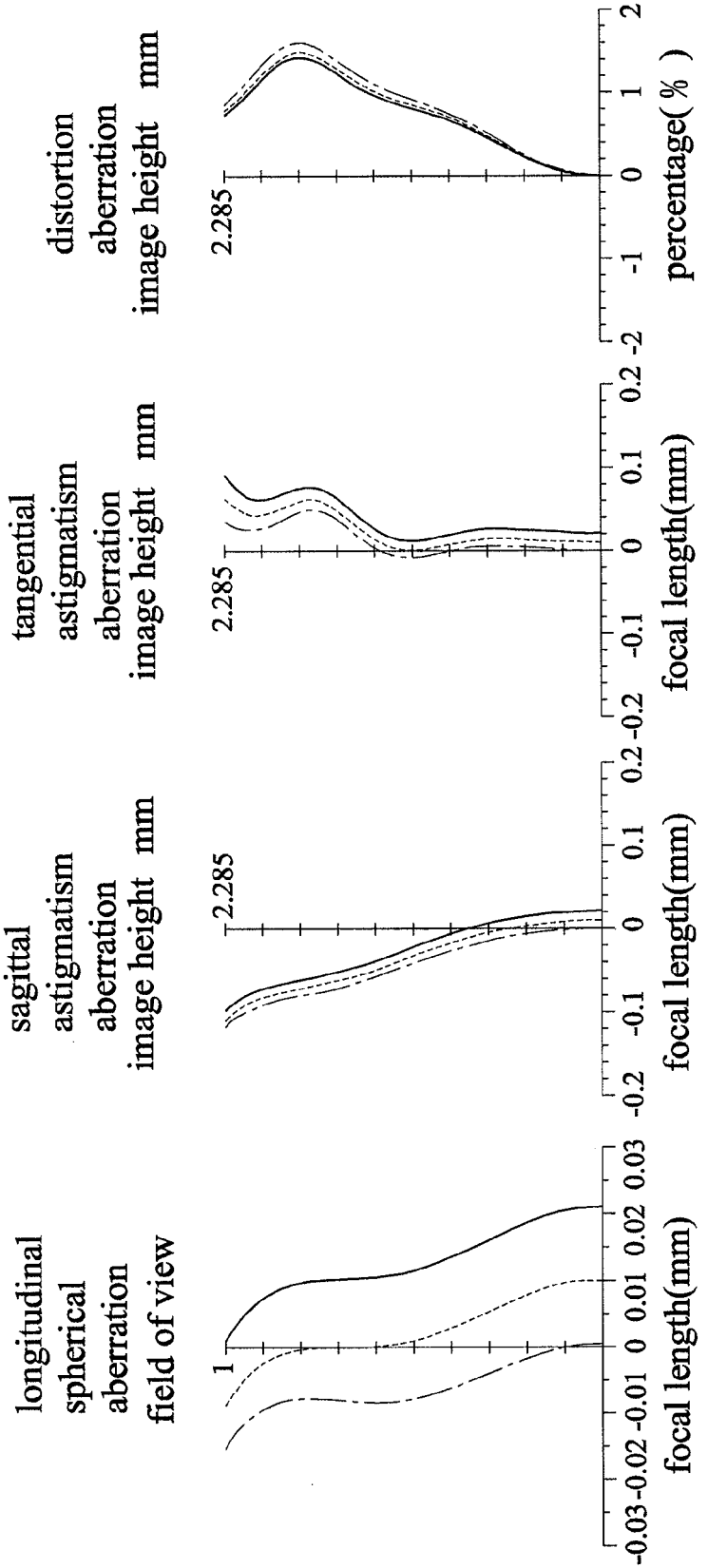
FIGS. 5(a) to 5(d) show different optical characteristics of the imaging lens of the first preferred embodiment.

Moreover, as shown in FIG. 5 (d), since each of the curves corresponding to distortion aberration falls within the range of ±1.6%, the first preferred embodiment is able to meet requirements in imaging quality of most optical systems.

In view of the above, even with the system length reduced down to 4.23 mm, the imaging lens 100 of the first preferred embodiment is still able to achieve a relatively good optical performance.

Figure 6:
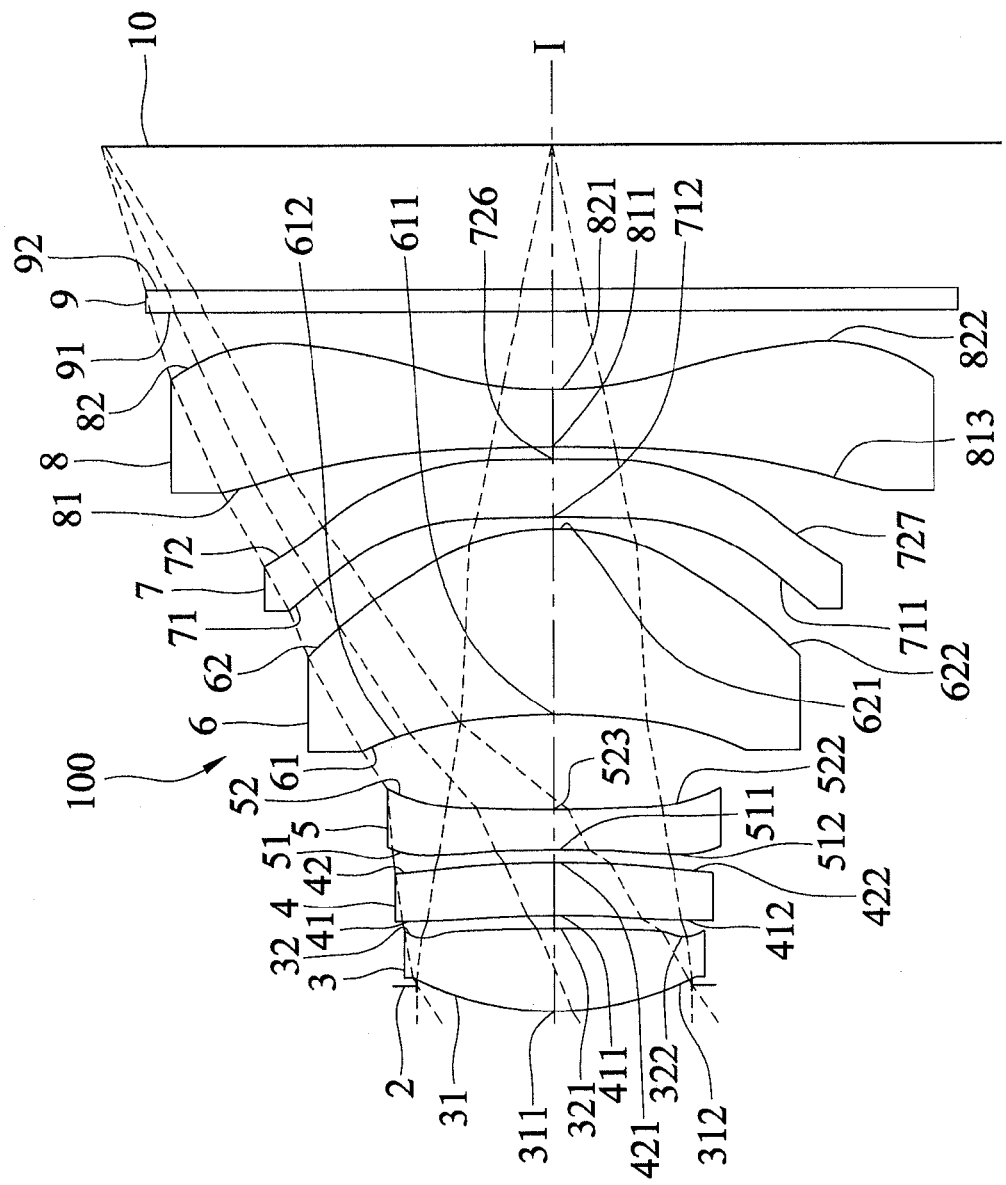
FIG. 6 is a schematic diagram that illustrates the second preferred embodiment of an imaging lens according to the present invention.

FIG. 6 illustrates the second preferred embodiment of an imaging lens 100 according to the present invention, which has a configuration similar to that of the first preferred embodiment.

Shown in FIG. 7 is a table that lists values of some optical parameters corresponding to the surfaces 31-91, 32-92 of the second preferred embodiment. The imaging lens 100 has an overall system focal length of 3.36 mm, an HFOV of 34.3°, an F-number of 2.40, and a system length of 4.44 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:
ALT/T2=9.04
ALT/AGmax=4.98
ALT/T4=2.57
EFL/T1=8.00
T5/T2=1.11
EFL/T2=12.44
EFL/T5=11.20
EFL/AGmax=6.86
EFL/T4=3.54
Gaa/AGmax=1.53
CTmax/T4=1.00

Figure 9:
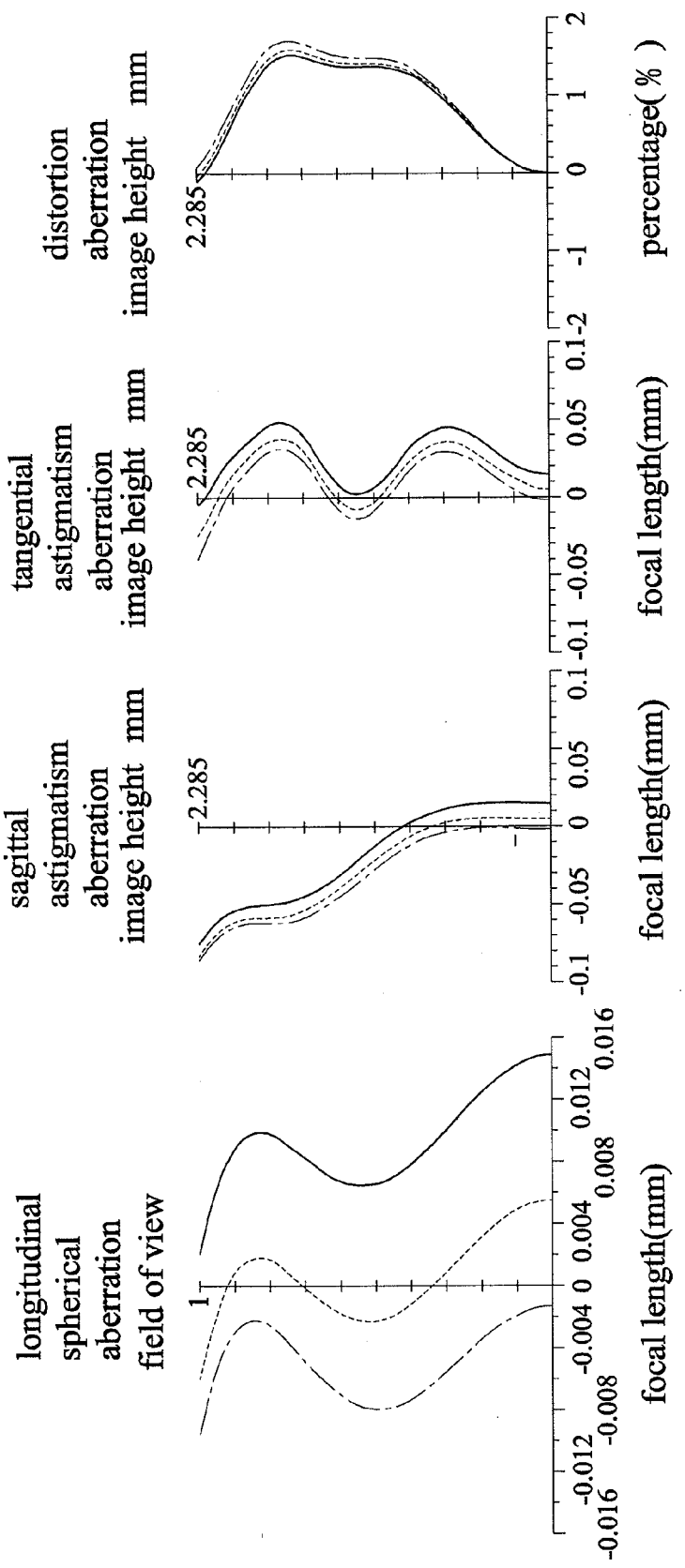
FIGS. 9(a) to 9(d) show different optical characteristics of the imaging lens of the second preferred embodiment.

FIGS. 9(a) to 9(d) show simulation results corresponding to longitudinal spherical aberration, sagittal astigmatism aberration, tangential astigmatism aberration, and distortion aberration of the second preferred embodiment, respectively. It can be understood from FIG. 9(a) that, since the curves corresponding to longitudinal spherical aberration are close to each other, the second preferred embodiment is able to achieve a relatively low spherical aberration at each of the wavelengths, and has a relatively low chromatic aberration. Referring to FIGS. 9(b), 9(c) and 9(d), since the curves corresponding to astigmatism aberrations fall within the range of ±0.09 mm of focal length, and the curves corresponding to distortion aberration fall within the range of ±1.8%, the second preferred embodiment is able to achieve a relatively good optical performance even with the system length reduced down to 4.44 mm.

Figure 10:
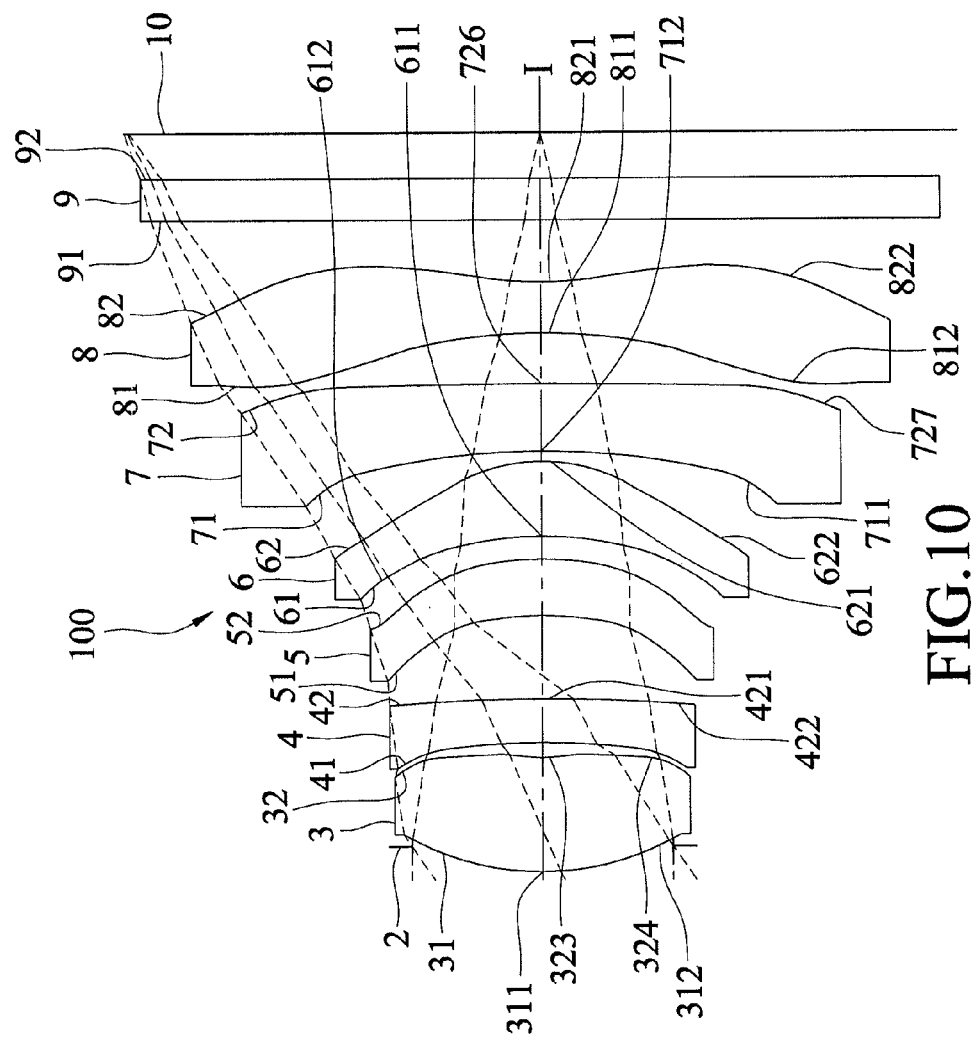
FIG. 10 is a schematic diagram that illustrates the third preferred embodiment of an imaging lens according to the present invention.

Referring to FIG. 10, the differences between the first and third preferred embodiments of the imaging lens 100 of this invention reside in that: the image-side surface 32 of the first lens element 3 has a concave portion 323 in a vicinity of the optical axis (I), and a convex portion 324 in a vicinity of a periphery of the first lens element 3; the second lens element 4 has a negative refractive power, and the object-side surface 41 thereof is a concave surface; the third lens element 5 has a positive refractive power, the object-side surface 51 thereof is a concave surface, and the image-side surface 52 thereof is a convex surface; the fifth lens element 7 has a negative refractive power; and the object-side surface 81 of the sixth lens element 8 has a concave portion 811 in a vicinity of the optical axis (I), and a convex portion 812 in a vicinity of a periphery of the sixth lens element 8.

Shown in FIG. 11 is a table that lists values of some optical parameters corresponding to the surfaces 31-91, 32-92 of the third preferred embodiment. The imaging lens 100 has an overall system focal length of 4.17 mm, an HFOV of 35.6°, an F-number of 2.20, and a system length of 5.28 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:
ALT/T2=9.50
ALT/AGmax=5.00
ALT/T4=5.50
EFL/T1=4.92
T5/T2=1.55
EFL/T2=13.48
EFL/T5=8.70
EFL/AGmax=7.09
EFL/T4=7.81
Gaa/AGmax=2.16
CTmax/T4=1.59

Figures 13A, 13B, 13C, 13D:
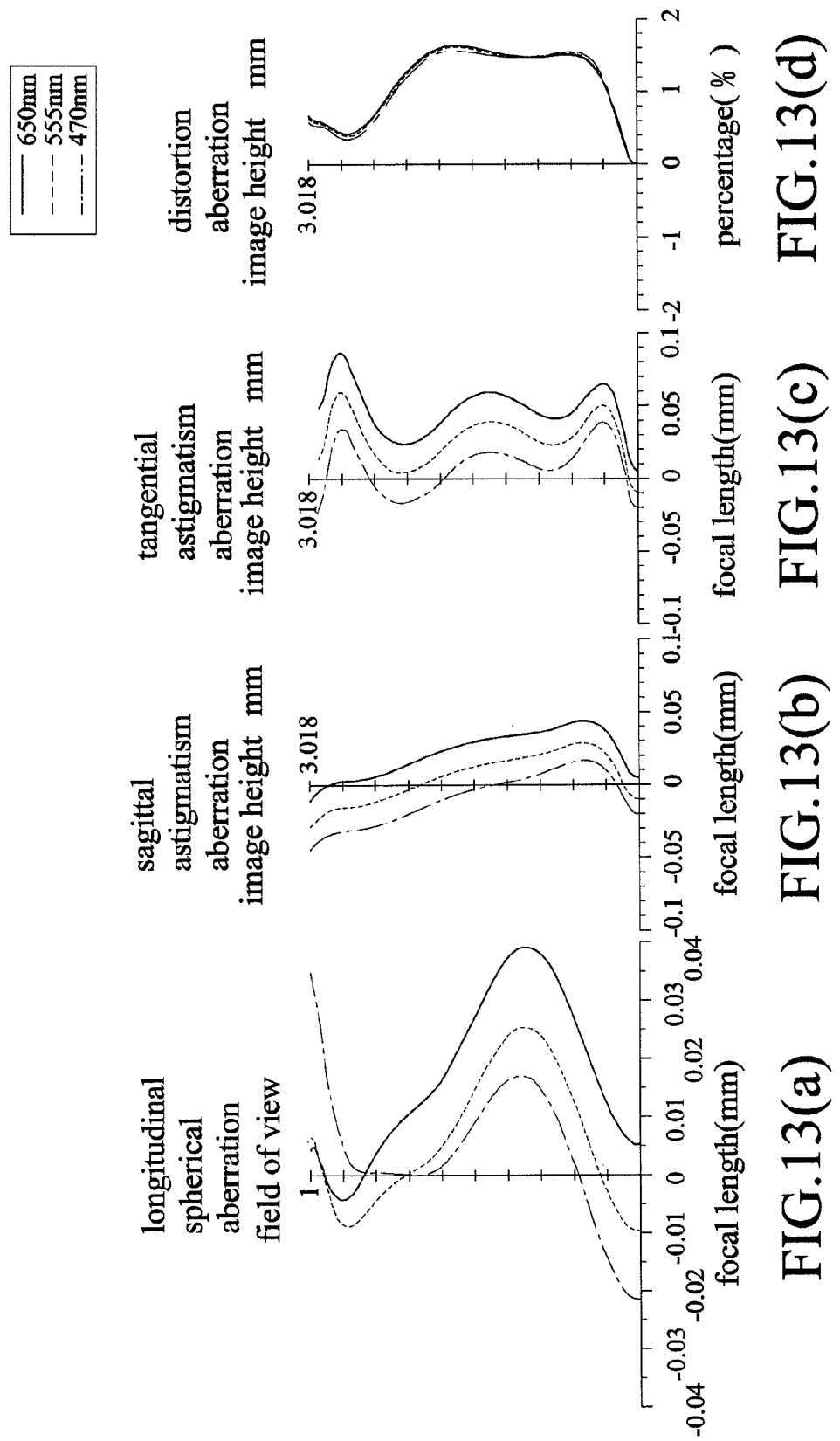
FIGS. 13(a) to 13(d) show different optical characteristics of the imaging lens of the third preferred embodiment.

FIGS. 13(a) to 13(d) show simulation results corresponding to longitudinal spherical aberration, sagittal astigmatism aberration, tangential astigmatism aberration, and distortion aberration of the third preferred embodiment, respectively. It can be understood from FIG. 13 (a) that, since the curves corresponding to longitudinal spherical aberration are close to each other, the third preferred embodiment is able to achieve a relatively low spherical aberration at each of the wavelengths, and has a relatively low chromatic aberration. Referring to FIGS. 13(b), 13(c) and 13(d), since the curves corresponding to astigmatism aberrations fall within the range of ±0.1 mm of focal length, and the curves corresponding to distortion aberration fall within the range of ±1.8%, the third preferred embodiment is able to achieve a relatively good optical performance even with the system length reduced down to 5.28 mm.

Figure 14:
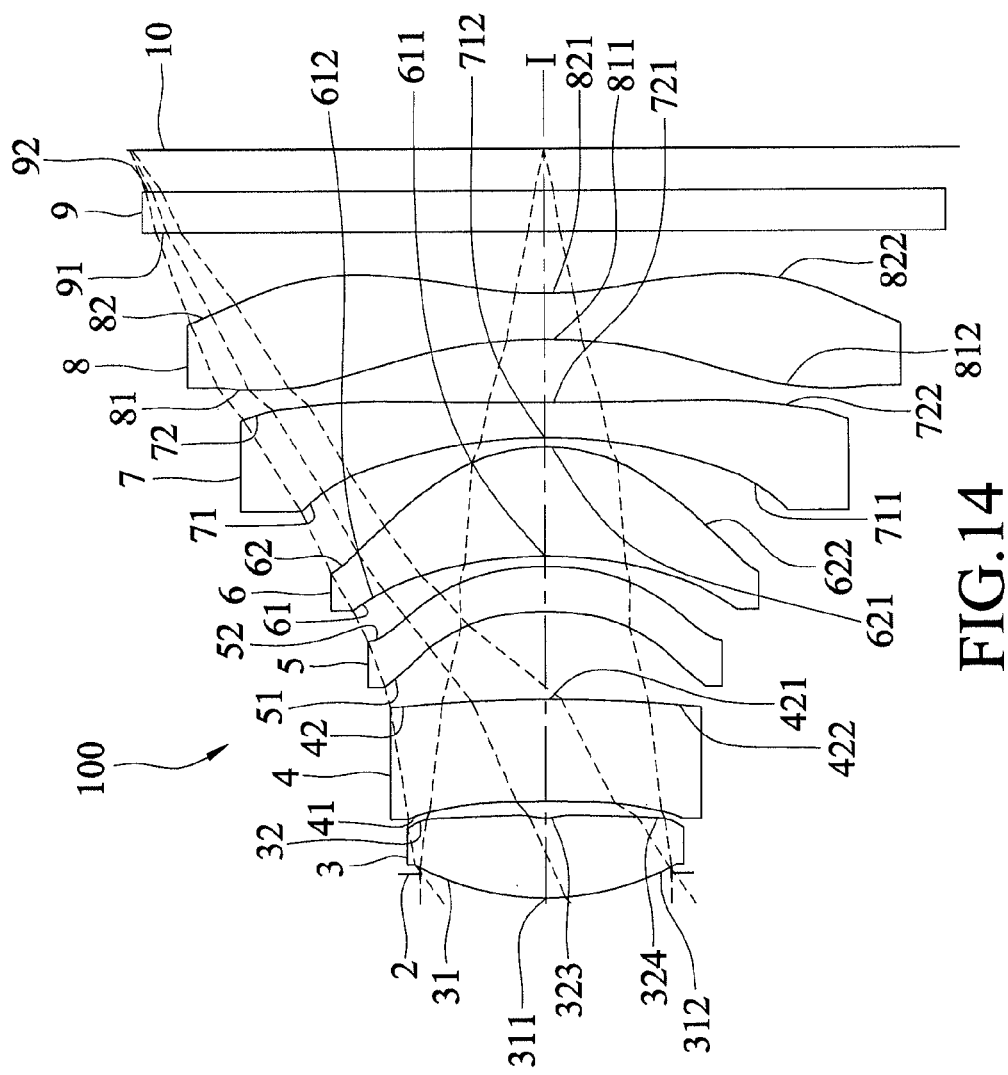
FIG. 14 is a schematic diagram that illustrates the fourth preferred embodiment of an imaging lens according to the present invention.

Referring to FIG. 14, the differences between the third and fourth preferred embodiments of the imaging lens 100 of this invention reside in that: the image-side surface 72 of the fifth lens element 7 has a concave portion 721 in a vicinity of the optical axis (I), and a convex portion 722 in a vicinity of a periphery of the fifth lens element 7.

Shown in FIG. 15 is a table that lists values of some optical parameters corresponding to the surfaces 31-91, 32-92 of the fourth preferred embodiment. The imaging lens 100 has an overall system focal length of 4.04 mm, an HFOV of 36.8°, an F-number of 2.20, and a system length of 5.39 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

ALT/T2=4.14
ALT/AGmax=4.77
ALT/T4=3.83
EFL/T1=6.93
T5/T2=0.36
EFL/T2=5.53
EFL/T5=15.50
EFL/AGmax=6.38
EFL/T4=5.11
Gaa/AGmax=2.07
CTmax/T4=1.00

Figure 17:
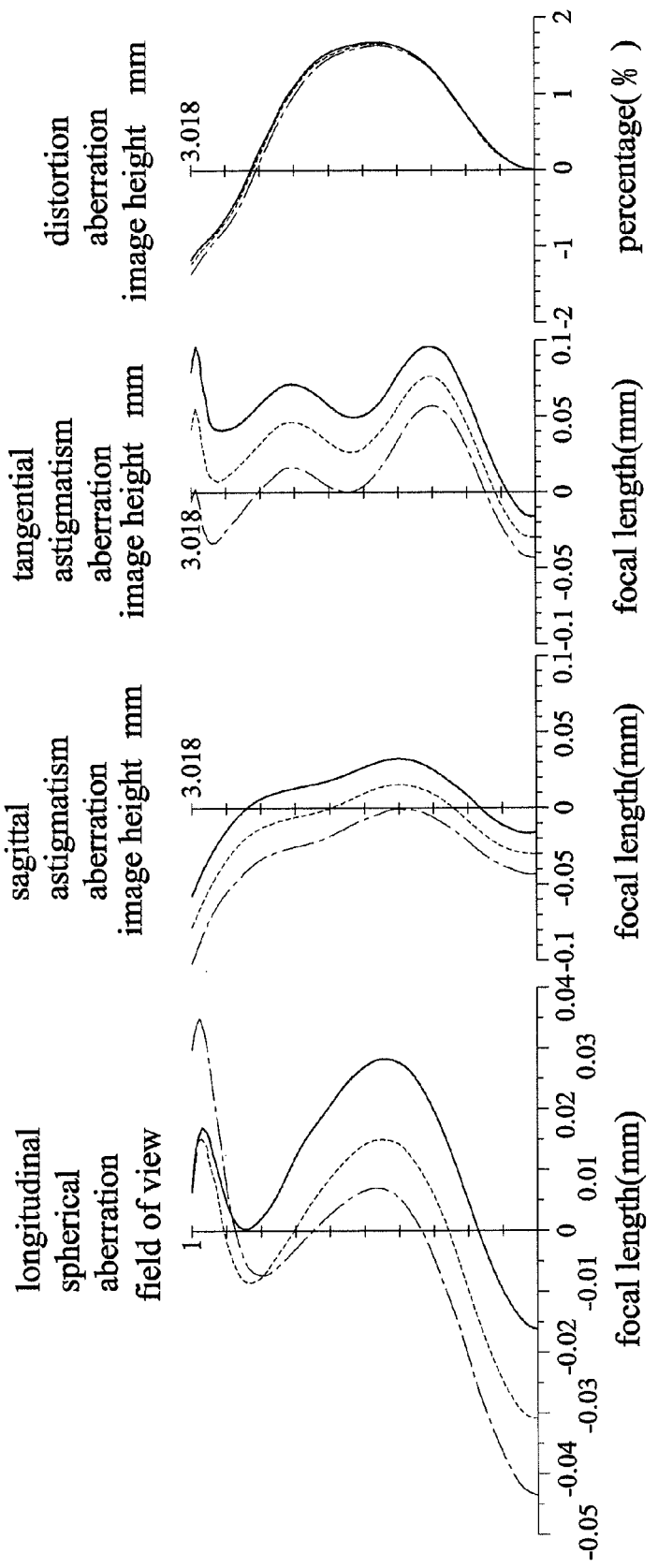
FIGS. 17(a) to 17(d) show different optical characteristics of the imaging lens of the fourth preferred embodiment.

FIGS. 17(a) to 17(d) show simulation results corresponding to longitudinal spherical aberration, sagittal astigmatism aberration, tangential astigmatism aberration, and distortion aberration of the fourth preferred embodiment, respectively. It can be understood from FIG. 17 (a) that, since the curves corresponding to longitudinal spherical aberration are close to each other, the fourth preferred embodiment is able to achieve a relatively low spherical aberration at each of the wavelengths, and has a relatively low chromatic aberration. Referring to FIGS. 17(b), 17(c) and 17(d), since the curves corresponding to astigmatism aberrations fall within the range of ±0.1 mm of focal length, and the curves corresponding to distortion aberration fall within the range of ±1.8%, the fourth preferred embodiment is able to achieve a relatively good optical performance even with the system length reduced down to 5.39 mm.

Figure 18:
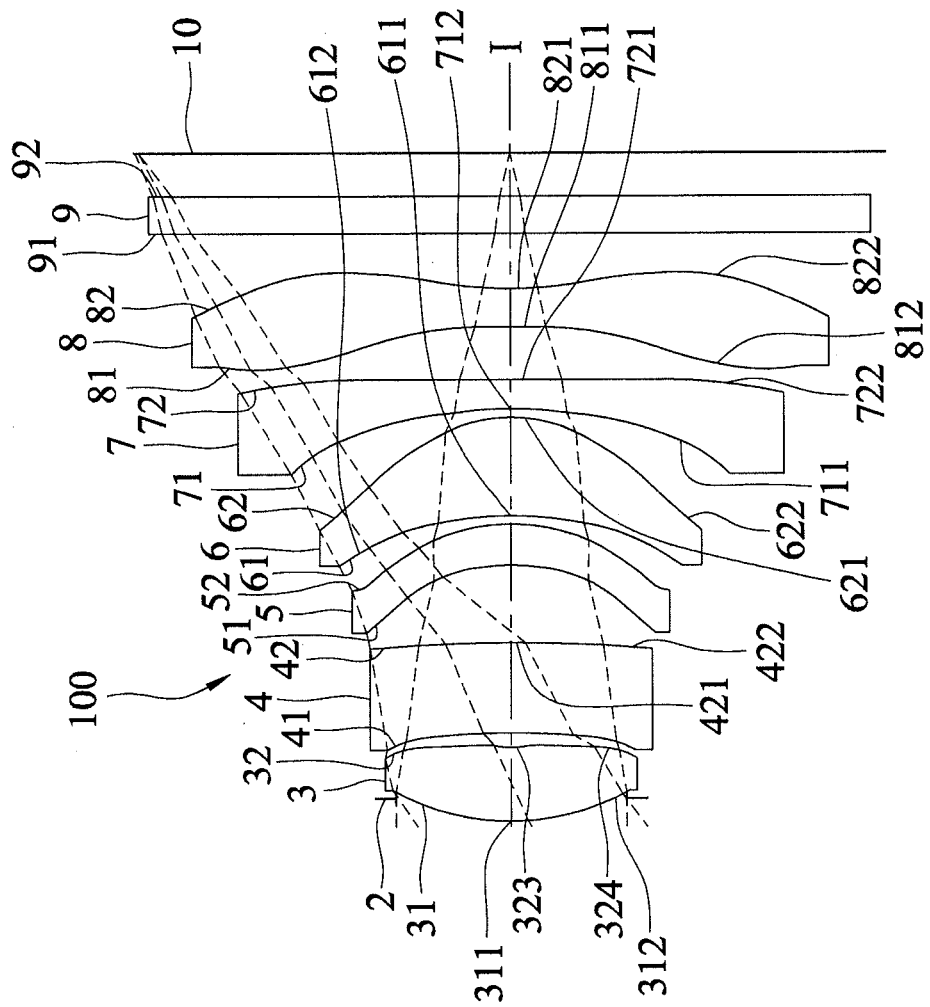
FIG. 18 is a schematic diagram that illustrates the fifth preferred embodiment of an imaging lens according to the present invention.

Referring to FIG. 18, the differences between the third and fifth preferred embodiments of the imaging lens 100 of this invention reside in that: the image-side surface 72 of the fifth lens element 7 has a concave portion 721 in a vicinity of the optical axis (I), and a convex portion 722 in a vicinity of a periphery of the fifth lens element 7.

Shown in FIG. 19 is a table that lists values of some optical parameters corresponding to the surfaces 31-91, 32-92 of the fifth preferred embodiment. The imaging lens 100 has an overall system focal length of 4.09 mm, an HFOV of 36.4°, an F-number of 2.20, and a system length of 5.39 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

ALT/T2=4.12
ALT/AGmax=4.80
ALT/T4=3.75
EFL/T1=6.82
T5/T2=0.33
EFL/T2=5.64
EFL/T5=17.10
EFL/AGmax=6.57
EFL/T4=5.14
Gaa/AGmax=2.10
CTmax/T4=1.00

Figure 21:
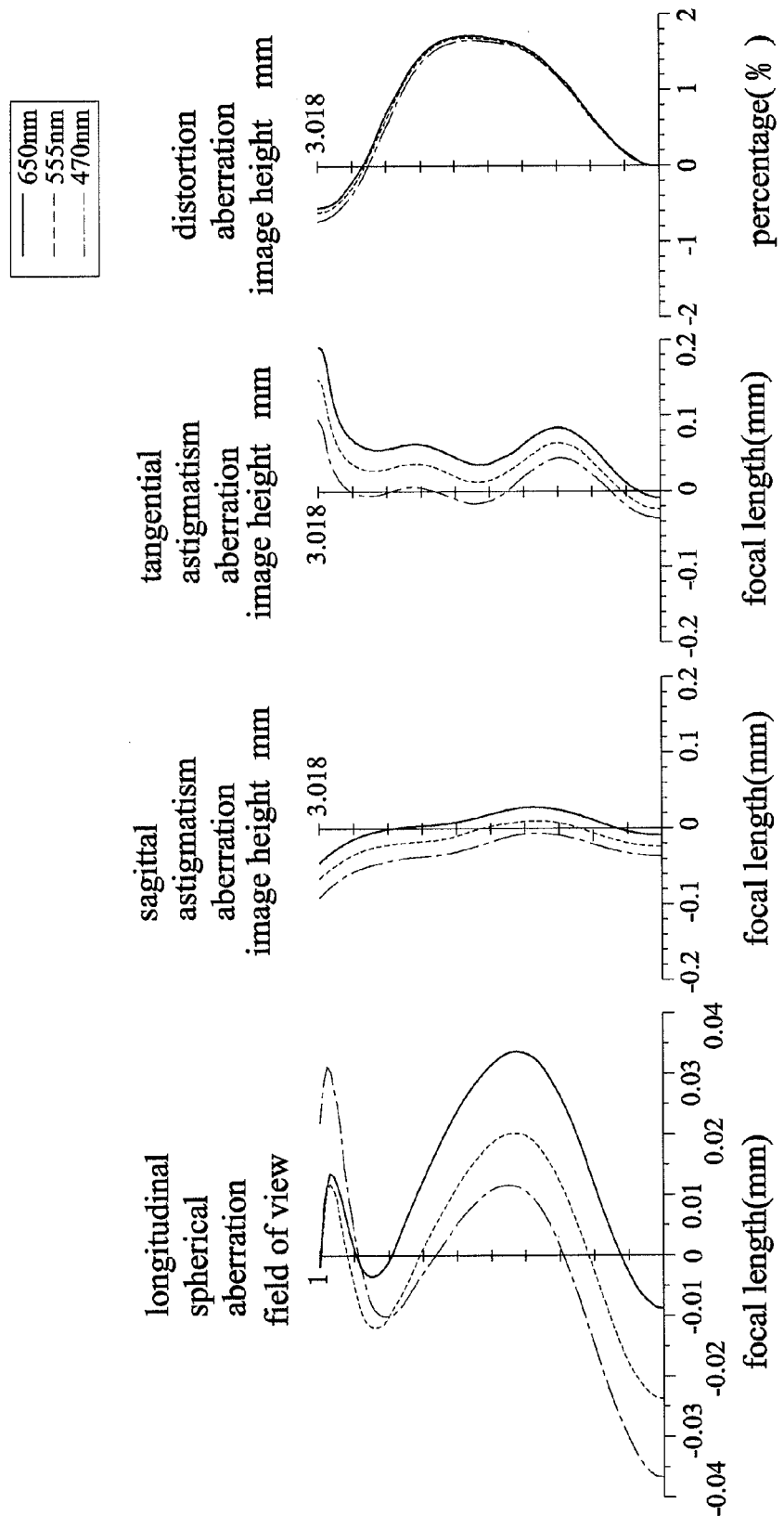
FIGS. 21(*a*) to 21(*d*) show different optical characteristics of the imaging lens of the fifth preferred embodiment.

FIGS. 21(a) to 21(d) show simulation results corresponding to longitudinal spherical aberration, sagittal astigmatism aberration, tangential astigmatism aberration, and distortion aberration of the fifth preferred embodiment, respectively. It can be understood from FIG. 21(a) that, since the curves corresponding to longitudinal spherical aberration are close to each other, the fifth preferred embodiment is able to achieve a relatively low spherical aberration at each of the wavelengths, and has a relatively low chromatic aberration. Referring to FIGS. 21(b), 21(c) and 21(d), since the curves corresponding to astigmatism aberrations fall within the range of ±0.2 mm of focal length, and the curves corresponding to distortion aberration fall within the range of ±1.8%, the fifth preferred embodiment is able to achieve a relatively good optical performance even with the system length reduced down to 5.39 mm.

Figure 22:
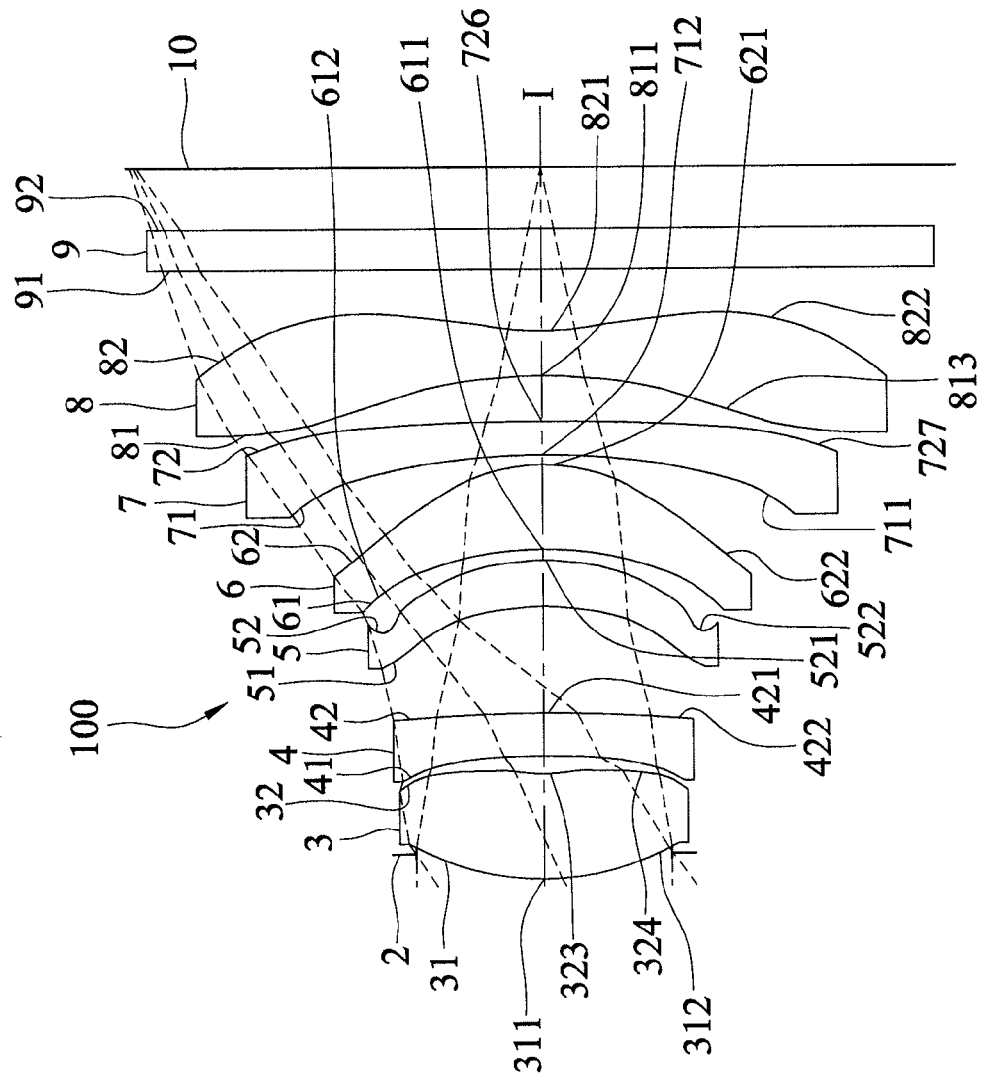
FIG. 22 is a schematic diagram that illustrates the sixth preferred embodiment of an imaging lens according to the present invention.

Referring to FIG. 22, the differences between the third and sixth preferred embodiments of the imaging lens 100 of this invention reside in that: the image-side surface 52 of the third lens element 5 has a convex portion 521 in a vicinity of the optical axis (I), and a concave portion 522 in a vicinity of a periphery of the third lens element 5; and the object-side surface 81 of the sixth lens element 8 is a concave surface.

Shown in FIG. 23 is a table that lists values of some optical parameters corresponding to the surfaces 31-91, 32-92 of the sixth preferred embodiment. The imaging lens 100 has an overall system focal length of 4.18 mm, an HFOV of 35.5°, an F-number of 2.20, and a system length of 5.24 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are as follows:

ALT/T2=8.39
ALT/AGmax=3.40
ALT/T4=4.21
EFL/T1=5.27
T5/T2=0.78
EFL/T2=13.18
EFL/T5=16.80
EFL/AGmax=5.34
EFL/T4=6.61
Gaa/AGmax=1.76
CTmax/T4=1.25

Figure 25:
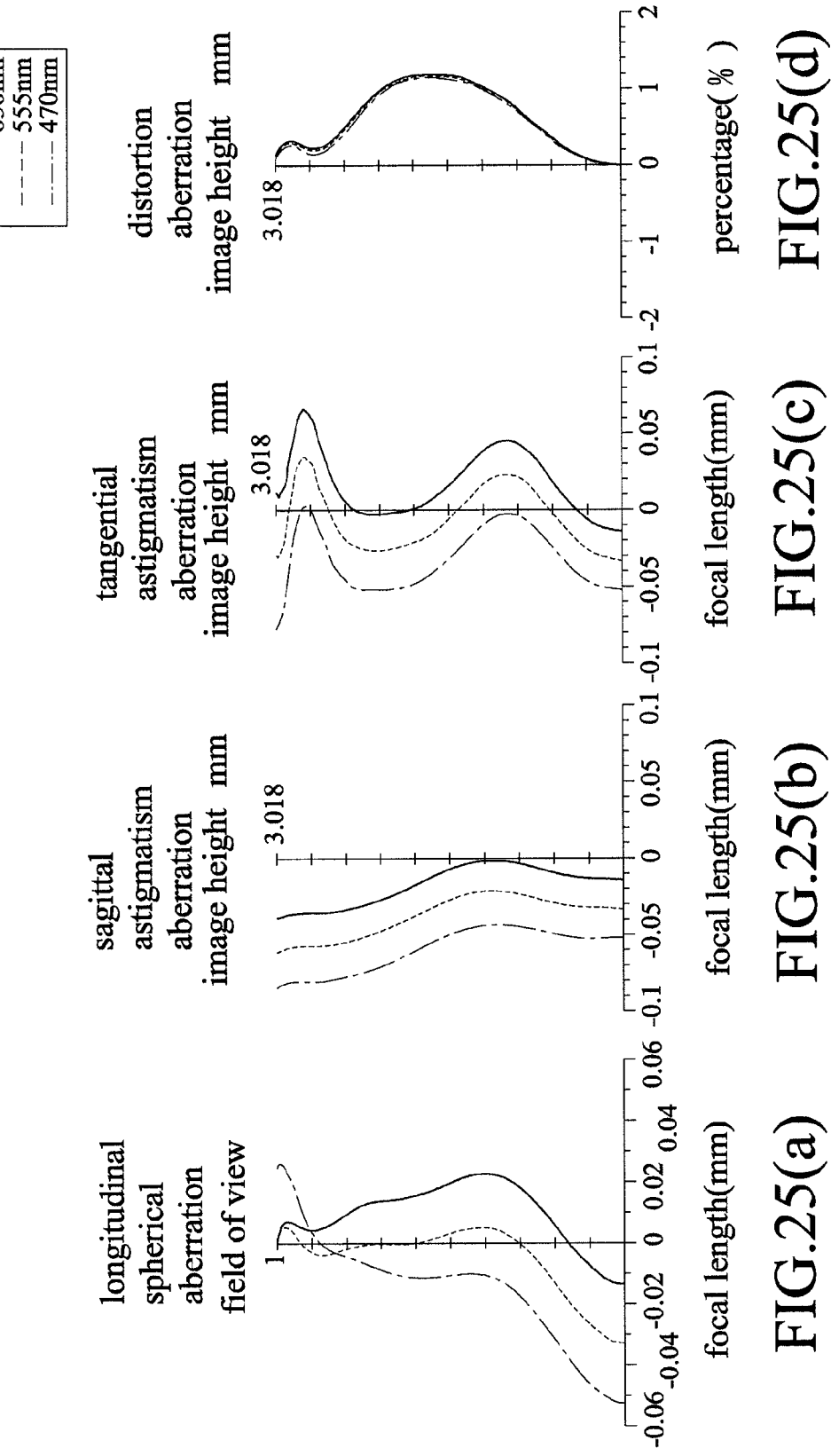
FIGS. 25(*a*) to 25(*d*) show different optical characteristics of the imaging lens of the sixth preferred embodiment.

FIGS. 25(a) to 25(d) show simulation results corresponding to longitudinal spherical aberration, sagittal astigmatism aberration, tangential astigmatism aberration, and distortion aberration of the sixth preferred embodiment, respectively. It can be understood from FIG. 25 (a) that, since the curves corresponding to longitudinal spherical aberration are close to each other, the sixth preferred embodiment is able to achieve a relatively low spherical aberration at each of the wavelengths, and has a relatively low chromatic aberration. Referring to FIGS. 25(b), 25(c) and 25(d), since the curves corresponding to astigmatism aberrations fall within the range of ±0.09 mm of focal length, and the curves corresponding to distortion aberration fall within the range of ±1.2%, the sixth preferred embodiment is able to achieve a relatively good optical performance even with the system length reduced down to 5.24 mm.

Figure 26:
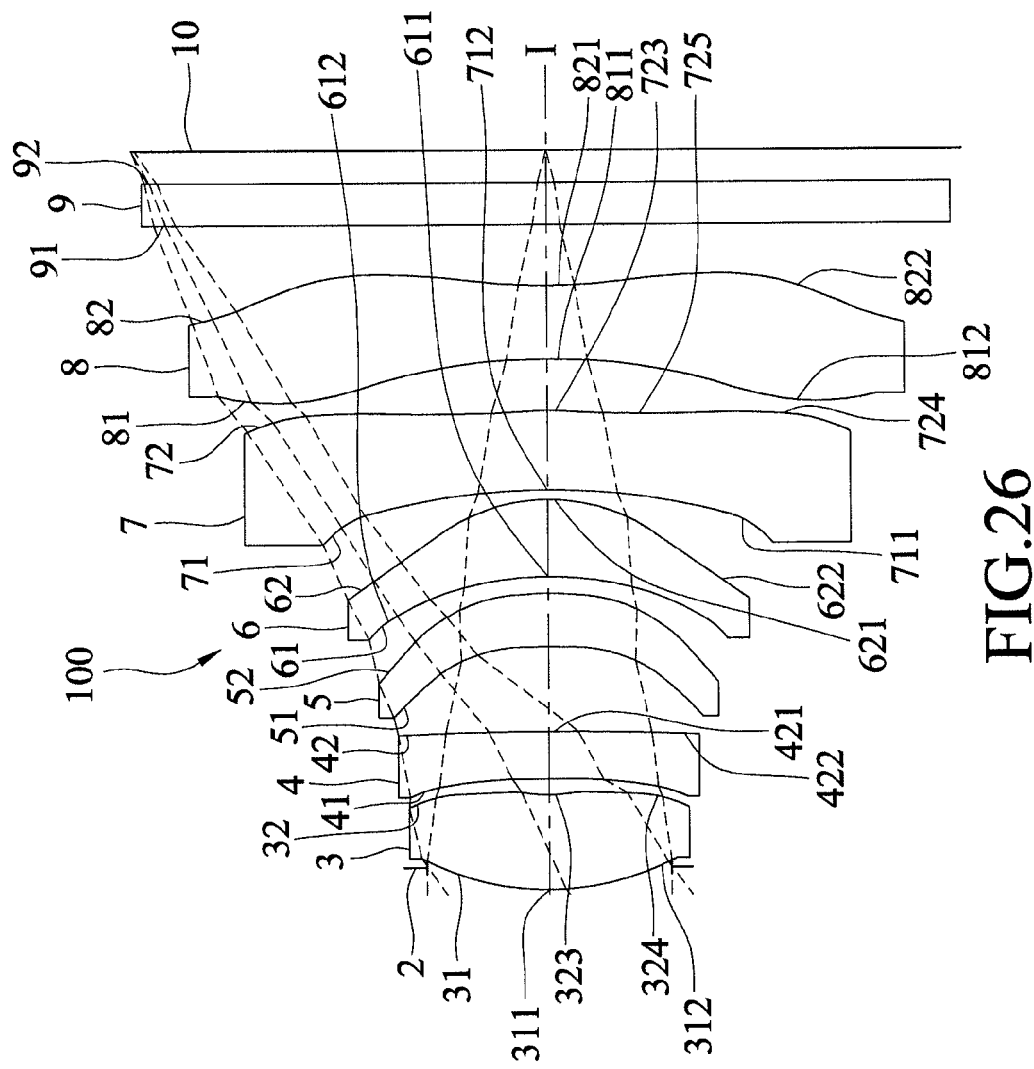
FIG. 26 is a schematic diagram that illustrates the seventh preferred embodiment of an imaging lens according to the present invention.

Referring to FIG. 26, the differences between the third and seventh preferred embodiments of the imaging lens 100 of this invention reside in that: the image-side surface 72 of the fifth lens element 7 has a first convex portion 723 in a vicinity of the optical axis (I), a second convex portion 724 in a vicinity of a periphery of the fifth lens element 7, and a concave portion 725 between the first and second convex portions 723, 724.

Shown in FIG. 27 is a table that lists values of some optical parameters corresponding to the surfaces 31-91, 32-92 of the seventh preferred embodiment. The imaging lens 100 has an overall system focal length of 3.94 mm, an HFOV of 37.3°, an F-number of 2.20, and a system length of 5.35 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are as follows:

ALT/T2=8.87
ALT/AGmax=5.00
ALT/T4=5.45
EFL/T1=5.62
T5/T2=1.59
EFL/T2=11.41
EFL/T5=7.17
EFL/AGmax=6.42
EFL/T4=7.01
Gaa/AGmax=2.11
CTmax/T4=1.25

Figure 29:
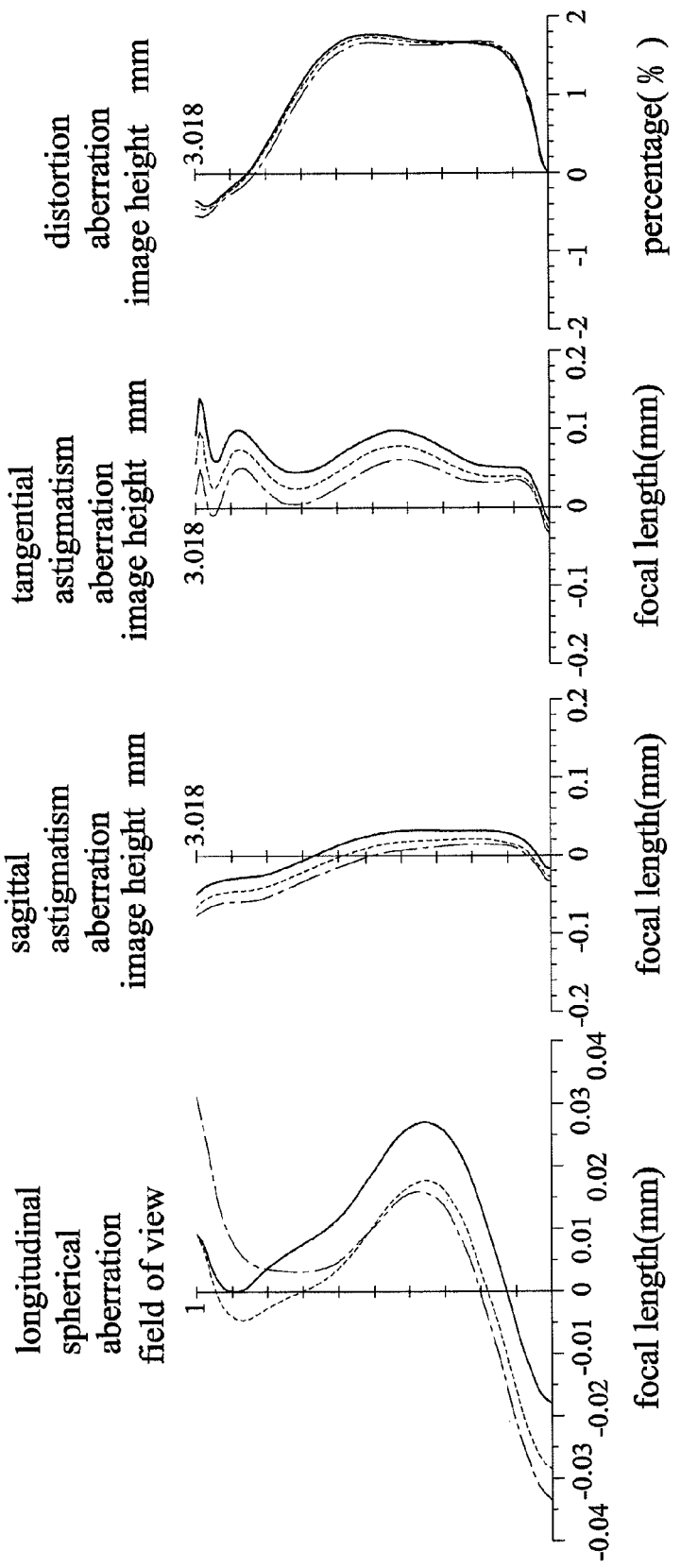
FIGS. 29(*a*) to 29(*d*) show different optical characteristics of the imaging lens of the seventh preferred embodiment.

FIGS. 29(a) to 29(d) show simulation results corresponding to longitudinal spherical aberration, sagittal astigmatism aberration, tangential astigmatism aberration, and distortion aberration of the seventh preferred embodiment, respectively. It can be understood from FIG. 29(a) that, since the curves corresponding to longitudinal spherical aberration are close to each other, the seventh preferred embodiment is able to achieve a relatively low spherical aberration at each of the wavelengths, and has a relatively low chromatic aberration. Referring to FIGS. 29(b), 29(c) and 29(d), since the curves corresponding to astigmatism aberrations fall within the range of ±0.16 mm of focal length, and the curves corresponding to distortion aberration fall within the range of ±1.8%, the seventh preferred embodiment is able to achieve a relatively good optical performance even with the system length reduced down to 5.35 mm.

Shown in FIG. 30 is a table that lists the aforesaid relationships among some of the aforementioned optical parameters corresponding to the seven preferred embodiments for comparison. When each of the optical parameters of the imaging lens 10 according to this invention satisfies the following optical relationships, the optical performance is still relatively good even with the reduced system length:

$ALT/T2 \leq 9.5$ (2)

$ALT/AGmax \leq 5.0$ (3)

$ALT/T4 \leq 5.5$ (4)

$EFL/T1 \leq 8.5$ (5)

$T5/T2 \leq 1.6$ (6)

$EFL/T2 \leq 13.5$ (7)

$EFL/AGmax \leq 7.5$ (8)

$7.0 \leq EFL/T5$ (9)

$EFL/T4 \leq 8.0$ (10)

$Gaa/AGmax \leq 2.2$ (11)

$CTmax/T4 \leq 1.6$ (12)

Reduction of the system length of the imaging lens 100 may result in reduced ALT and T2. Since ALT is the sum of thicknesses of the lens elements 3-8, reducible ratio of ALT is greater than that of T2. Better arrangement may be achieved when the relationship (2) is satisfied. Preferably, the relationship (2) may have a lower limit: $3.7 \leq ALT/T2 \leq 9.5$, so that ALT falls within a suitable range.

Reduction of the system length of the imaging lens 100 may result in reduced ALT. Considering optical properties (e.g., light incident location/angle, etc.) and manufacturing capability (such as assembly), reduction of AGmax is limited. Therefore, reducible ratio of ALT is greater than that of AGmax according to the present invention. Better arrangement may be achieved when the relationship (3) is satisfied. Preferably, the relationship (3) may have a lower limit: $3.0 \leq ALT/AGmax \leq 5.0$, so that ALT falls within a suitable range.

Reduction of the system length of the imaging lens 100 may result in reduced ALT and T4. Since ALT is the sum of thicknesses of the lens elements 3-8 and the fourth lens element 6 has a greater effective optical radius and may be made thicker to facilitate fabrication, reducible ratio of T4 is smaller than that of ALT. Better arrangement may be achieved when the relationship (4) is satisfied. Preferably, the relationship (4) may have a lower limit: $2.0 \leq ALT/T4 \leq 5.5$, so that T4 falls within a suitable range.

Reduction of the system length of the imaging lens 100 may result in reduced EFL. Since the first lens element 3 has the positive refractive power, it may be made thicker. Better arrangement may be achieved when the relationship (5) is satisfied. Preferably, the relationship (5) may have a lower limit: $4.5 \leq EFL/T1 \leq 8.5$, so that T1 falls within a suitable range.

Due to the greater effective optical radius of the fifth lens element 7, thicker T5 facilitates manufacturing. Since the image-side surface 42 of the second lens element 4 has the convex portion 421 in the vicinity of the optical axis (I), reduction of T2 has a relatively serious limitation. Accordingly, reducible ratio of T2 is smaller than that of T5. Better arrangement may be achieved when the relationship (6) is satisfied. Preferably, the relationship (6) may have a lower limit: $0.1 \leq T5/T2 \leq 1.6$, so that T5 falls within a suitable range.

Reduction of the system length of the imaging lens 100 may result in reduced EFL. Since the image-side surface 42 of the second lens element 4 has the convex portion 421 in the vicinity of the optical axis (I), reduction of T2 has a relatively serious limitation. Accordingly, reducible ratio of T2 is smaller than that of EFL. Better arrangement may be achieved when the relationship (7) is satisfied. In addition, when EFL/T2≤11.5, thicker T2 facilitates manufacturing. Preferably, the relationship (7) may have a lower limit: $5.0 \leq EFL/T2 \leq 13.5$, so that T2 falls within a suitable range.

Reduction of the system length of the imaging lens 100 may result in reduced EFL. Considering optical properties (e.g., light incident location/angle, etc.) and manufacturing capability (such as assembly), reduction of AGmax is limited. Therefore, reducible ratio of EFL is greater than that of AGmax according to the present invention. Better arrangement may be achieved when the relationship (8) is satisfied. Preferably, the relationship (8) may have a lower limit: $5.0 \leq EFL/AGmax \leq 7.5$, so that AGmax falls within a suitable range.

Reduction of the system length of the imaging lens 100 may result in reduced EFL. In this invention, the fifth lens element 7 may be designed to be thinner, so that the reducible ratio of T5 is greater than that of EFL. Better arrangement may be achieved when the relationship (9) is satisfied. Preferably, the relationship (9) may have an upper limit: $7.0 \leq EFL/T5 \leq 18.0$, so that T5 falls within a suitable range.

Reduction of the system length of the imaging lens 100 may result in reduced EFL. Since the fourth lens element 6 has a greater effective optical radius and may be made thicker to facilitate fabrication, reducible ratio of T4 is smaller than that of EFL. Better arrangement may be achieved when the relationship (10) is satisfied. Preferably, the relationship (10) may have a lower limit: $3.0 \leq EFL/T4 \leq 8.0$, so that T4 falls within a suitable range.

Reduction of Gaa favors reduction of the system length of the imaging lens 100. Since reducible ratio of AGmax is smaller than that of Gaa in the present invention, better arrangement may be achieved when the relationship (11) is satisfied. Preferably, the relationship (11) may have a lower limit: $1.0 \leq Gaa/AGmax \leq 2.2$, so that Gaa falls within a suitable range.

Since reduction of the system length of the imaging lens 100 may result in reduced thicknesses of most of the lens elements 3-8, CTmax may be reduced. Since the fourth lens element 6 has a greater effective optical radius and may be made thicker to facilitate fabrication, reducible ratio of T4 is smaller than that of CTmax. Better arrangement may be achieved when the relationship (12) is satisfied. Preferably, the relationship (12) may have a lower limit: $0.8 \leq CTmax/T4 \leq 1.6$, so that T4 falls within a suitable range.

To sum up, effects and advantages of the imaging lens 100 according to the present invention are described hereinafter.

1. The positive refractive power of the first lens element 3 may enhance converging capability of the imaging lens 10. By arranging the aperture stop 2 on the object-side of the first lens element 3, the system length may be further reduced.

2. By virtue of the convex portions 421, 621 and the concave portions 711, 821, optical aberration of the image may be corrected. Cooperation with the concave portion 811 or the negative refractive power of the sixth lens element 8 may further enhance correction effect on optical aberration of the image.

3. Since the sixth lens element 8 is made of a plastic material, weight and cost of the imaging lens 100 may be reduced.

4. Through design of the relevant optical parameters, such as ALT/T2, ALT/AGmax, ALT/T4, EFL/T1, T5/T2, EFL/T2, EFL/AGmax, EFL/T5, EFL/T4, Gaa/AGmax and CTmax/T4, optical aberrations, such as spherical aberration, may be reduced or even eliminated. Further, through surface design and arrangement of the lens elements 3-8, even with the system length reduced, optical aberrations may still be reduced or even eliminated, resulting in relatively good optical performance.

5. Through the aforesaid seven preferred embodiments, it is known that the system length of this invention may be reduced down to below 5.5 mm, so as to facilitate developing thinner relevant products with economic benefits.

Figure 31:
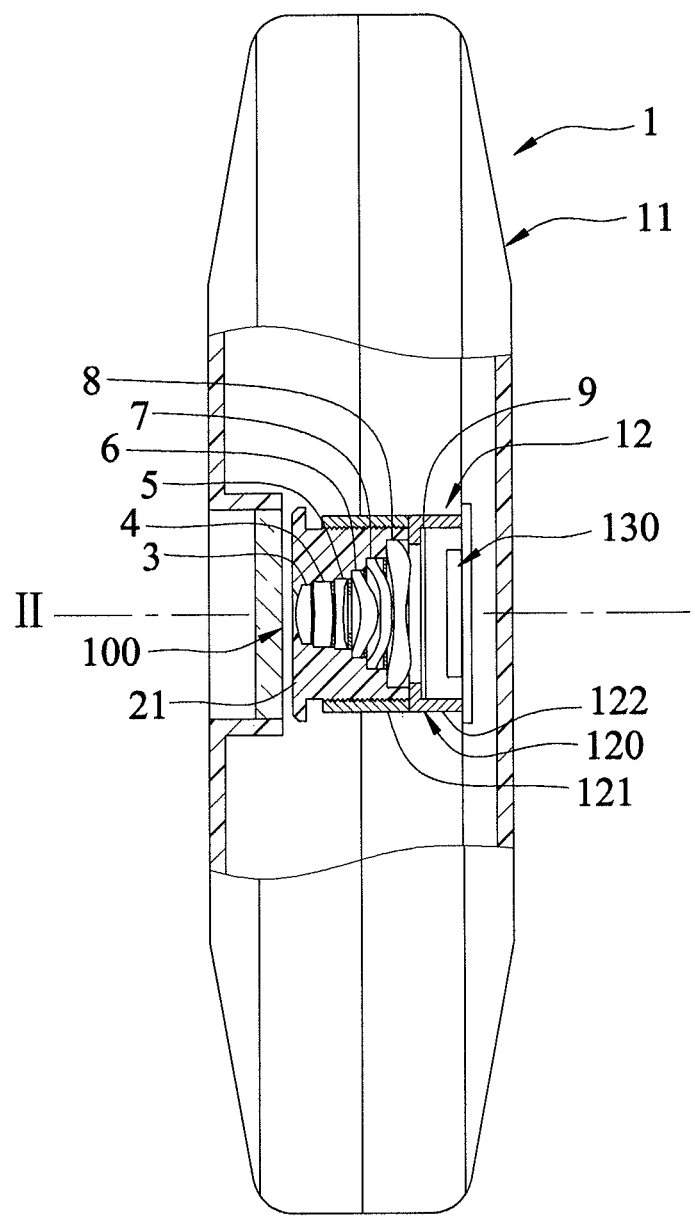
FIG. 31 is a schematic partly sectional view to illustrate a first exemplary application of the imaging lens of the present invention.

Shown in FIG. 31 is a first exemplary application of the imaging lens 100, in which the imaging lens 100 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 100 is disposed, a holder unit 120 on which the barrel 21 is disposed, and an image sensor 130 disposed at the image plane 10 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 100.

Figure 32:
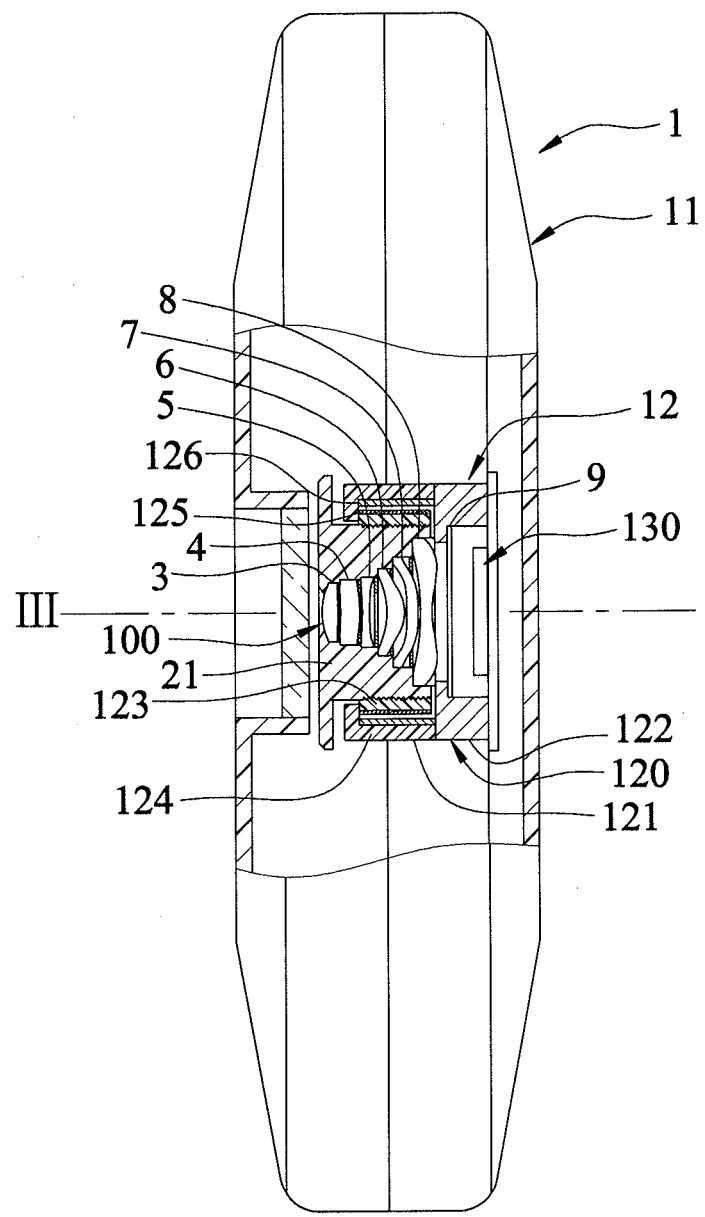
FIG. 32 is a schematic partly sectional view to illustrate a second exemplary application of the imaging lens of the present invention.

Shown in FIG. 32 is a second exemplary application of the imaging lens 100. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 100 therein, are movable with respect to the image sensor 130 along an axis (III), which coincides with the optical axis (I) of the imaging lens 100. The optical filter 9 of the imaging lens 100 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 100 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, a first lens element, a second lens element, a third lens element, a fourth lens element, a fifth lens element and a sixth lens element arranged in order from an object side to an image side along an optical axis of said imaging lens, each of said first lens element, said second lens element, said third lens element, said fourth lens element, said fifth lens element and said sixth lens element having a refractive power, and having an object-side surface facing toward the object side and an image-side surface facing toward the image side, wherein:

the refractive power of said first lens element is positive;
said image-side surface of said second lens element has a convex portion in a vicinity of the optical axis;
said object-side surface of said third lens element has a concave portion in a vicinity of the optical axis;
the refractive power of said fourth lens element is positive, wherein said image-side surface of said fourth lens element has a convex portion in a vicinity of the optical axis, and said object-side surface of said fourth lens element has a concave portion in a vicinity of the optical axis;

said object-side surface of said fifth lens element has a concave portion in a vicinity of a periphery of said fifth lens element; and said sixth lens element is made of a plastic material, and said image-side surface thereof has a concave portion in a vicinity of the optical axis;

wherein said imaging lens does not include any lens element with refractive power other than said first lens element, said second lens element, said third lens element, said fourth lens element, said fifth lens element and said sixth lens element; and wherein said object-side surface of said sixth lens element has a concave portion in a vicinity of the optical axis.

2. The imaging lens as claimed in claim 1, satisfying ALT/T2≤9.5, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, a distance between said object-side surface and said image-side surface of said fifth lens element at the optical axis, and a distance between said object-side surface and said image-side surface of said sixth lens element at the optical axis; and T2 represents the distance between said object-side surface and said image-side surface of said second lens element at the optical axis.

3. The imaging lens as claimed in claim 2, further satisfying ALT/AGmax≤5.0, where AGmax represents a maximum among a distance between said image-side surface of said first lens element and said object-side surface of said second lens element at the optical axis, a distance between said image-side surface of said second lens element and said object-side surface of said third lens element at the optical axis, a distance between said image-side surface of said third lens element and said object-side surface of said fourth lens element at the optical axis, a distance between said image-side surface of said fourth lens element and said object-side surface of said fifth lens element at the optical axis, and a distance between said image-side surface of said fifth lens element and said object-side surface of said sixth lens element at the optical axis.

4. The imaging lens as claimed in claim 3, wherein the refractive power of said sixth lens element is negative.

5. The imaging lens as claimed in claim 1, satisfying ALT/T4≤5.5, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, a distance between said object-side surface and said image-side surface of said fifth lens element at the optical axis, and a distance between said object-side surface and said image-side surface of said sixth lens element at the optical axis; and T4 represents the distance between said object-side surface and said image-side surface of said fourth lens element at the optical axis.

6. The imaging lens as claimed in claim 5, further satisfying EFL/T1≤8.5, where EFL represents a system focal length of said imaging lens, and T1 represents the distance between said object-side surface and said image-side surface of said first lens element at the optical axis.

7. The imaging lens as claimed in claim 6, further satisfying T5/T2≤1.6, where T5 represents the distance between said object-side surface and said image-side surface of said fifth lens element at the optical axis, and T2 represents the distance between said object-side surface and said image-side surface of said second lens element at the optical axis.

8. The imaging lens as claimed in claim 1, further satisfying EFL/AGmax≤7.5, where EFL represents a system focal length of said imaging lens, and AGmax represents a maximum among a distance between said image-side surface of said first lens element and said object-side surface of said second lens element at the optical axis, a distance between said image-side surface of said second lens element and said object-side surface of said third lens element at the optical axis, a distance between said image-side surface of said third lens element and said object-side surface of said fourth lens element at the optical axis, a distance between said image-side surface of said fourth lens element and said object-side surface of said fifth lens element at the optical axis, and a distance between said image-side surface of said fifth lens element and said object-side surface of said sixth lens element at the optical axis.

9. The imaging lens as claimed in claim 8, further satisfying 7.0≤EFL/T5, where T5 represents a distance between said object-side surface and said image-side surface of said fifth lens element at the optical axis.

10. The imaging lens as claimed in claim 9, satisfying EFL/T2≤13.5, T2 represents a distance between said object-side surface and said image-side surface of said second lens element at the optical axis.

11. The imaging lens as claimed in claim 1, satisfying EFL/T4≤8.0, where EFL represents a system focal length of said imaging lens, and T4 represents a distance between said object-side surface and said image-side surface of said fourth lens element at the optical axis.

12. The imaging lens as claimed in claim 11, further satisfying Gaa/AGmax≤2.2, where Gaa represents a sum of a distance between said image-side surface of said first lens element and said object-side surface of said second lens element at the optical axis, a distance between said image-side surface of said second lens element and said object-side surface of said third lens element at the optical axis, a distance between said image-side surface of said third lens element and said object-side surface of said fourth lens element at the optical axis, a distance between said image-side surface of said fourth lens element and said object-side surface of said fifth lens element at the optical axis, and a distance between said image-side surface of said fifth lens element and said object-side surface of said sixth lens element at the optical axis; and AGmax represents a maximum among the distance between said image-side surface of said first lens element and said object-side surface of said second lens element at the optical axis, the distance between said image-side surface of said second lens element and said object-side surface of said third lens element at the optical axis, the distance between said image-side surface of said third lens element and said object-side surface of said fourth lens element at the optical axis, the distance between said image-side surface of said fourth lens element and said object-side surface of said fifth lens element at the optical axis, and the distance between said image-side surface of said fifth lens element and said object-side surface of said sixth lens element at the optical axis.

13. The imaging lens as claimed in claim 1, satisfying ALT/AGmax≤5.0, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, a distance between said object-side surface and said image-side surface of said fifth lens element at the optical axis, and a distance between said object-side surface and said image-side surface of said sixth lens element at the optical axis; and AGmax represents a maximum among a distance between said image-side surface of said first lens element and said object-side surface of said second lens element at the optical axis, a distance between said image-side surface of said second lens element and said object-side surface of said third lens element at the optical axis, a distance between said image-side surface of said third lens element and said object-side surface of said fourth lens element at the optical axis, a distance between said image-side surface of said fourth lens element and said object-side surface of said fifth lens element at the optical axis, and a distance between said image-side surface of said fifth lens element and said object-side surface of said sixth lens element at the optical axis.

14. The imaging lens as claimed in claim 13, further satisfying CTmax/T4≤1.6, where CTmax represents a maximum among the distance between said object-side surface and said image-side surface of said first lens element at the optical axis, the distance between said object-side surface and said image-side surface of said second lens element at the optical axis, the distance between said object-side surface and said image-side surface of said third lens element at the optical axis, the distance between said object-side surface and said image-side surface of said fourth lens element at the optical axis, the distance between said object-side surface and said image-side surface of said fifth lens element at the optical axis, and the distance between said object-side surface and said image-side surface of said sixth lens element at the optical axis; and T4 represents the distance between said object-side surface and said image-side surface of said fourth lens element at the optical axis.

15. The imaging lens as claimed in claim 14, further satisfying EFL/T2≤11.5, where EFL represents a system focal length of said imaging lens, and T2 represents the distance between said object-side surface and said image-side surface of said second lens element at the optical axis.

16. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *